(12) United States Patent
Shey

(10) Patent No.: US 10,474,345 B2
(45) Date of Patent: Nov. 12, 2019

(54) USER INTERFACES AND METHODS FOR DISPLAYING CONTENT

(71) Applicant: Shawn Shey, Flushing, NY (US)

(72) Inventor: Shawn Shey, Flushing, NY (US)

(*) Notice: Subject to any disclaimer, the term of this patent is extended or adjusted under 35 U.S.C. 154(b) by 0 days.

(21) Appl. No.: 14/245,626

(22) Filed: Apr. 4, 2014

(65) Prior Publication Data

US 2015/0286333 A1    Oct. 8, 2015

(51) Int. Cl.
| | | |
|---|---|---|
| G06T 11/00 | (2006.01) | |
| G06T 11/60 | (2006.01) | |
| G06F 3/0488 | (2013.01) | |
| G06F 3/0484 | (2013.01) | |

(52) U.S. Cl.
CPC ........ *G06F 3/0488* (2013.01); *G06F 3/04845* (2013.01); *G06T 11/001* (2013.01); *G06T 11/60* (2013.01); *G06F 2203/04804* (2013.01); *G06T 2210/22* (2013.01)

(58) Field of Classification Search
CPC ...... G06F 3/0416; G06F 3/041; G06F 3/0412; G06F 3/048; G06F 3/0488; G06F 3/017; G06F 3/04845; G06F 2203/04804; G06F 21/81–85; G06F 21/60; G06F 21/606; G06F 2221/032; G06F 2203/04803; G06T 11/00; G06T 11/001; G06T 2210/22; G06T 11/60

See application file for complete search history.

(56) References Cited

U.S. PATENT DOCUMENTS

| | | | | |
|---|---|---|---|---|
| 5,801,697 A | * | 9/1998 | Parikh | G06F 3/0481 715/790 |
| 7,779,475 B2 | * | 8/2010 | Jakobson | G06F 21/62 726/26 |
| 2004/0193910 A1 | * | 9/2004 | Moles | G06F 21/62 726/27 |
| 2006/0244735 A1 | * | 11/2006 | Wilson | G06F 3/0488 345/173 |
| 2009/0080801 A1 | * | 3/2009 | Hatfield | G06T 11/60 382/283 |
| 2010/0066751 A1 | * | 3/2010 | Ryu | G06F 1/1626 345/581 |
| 2010/0171712 A1 | * | 7/2010 | Cieplinski | G06F 3/04883 345/173 |
| 2011/0029891 A1 | * | 2/2011 | Kim | H04M 1/72561 715/752 |
| 2011/0072400 A1 | * | 3/2011 | Watanabe | G06F 3/0488 715/863 |
| 2011/0185297 A1 | * | 7/2011 | Reid | G06F 3/04845 715/765 |

(Continued)

FOREIGN PATENT DOCUMENTS

| | | | |
|---|---|---|---|
| JP | 2012208794 A | * | 10/2012 |
| JP | 2013020522 A | * | 1/2013 |
| WO | WO 9947990 A1 | * | 9/1999 ........... G06F 3/0481 |

*Primary Examiner* — Temesghen Ghebretinsae
*Assistant Examiner* — Ivelisse Martinez Quiles
(74) *Attorney, Agent, or Firm* — Vista IP Law Group, LLP

(57) ABSTRACT

A user interface method includes: obtaining an image; obtaining a mask; receiving a user input at a device, the user input indicating that a portion of the image is desired to be viewed by a user; and in response to the user input, displaying on a screen of the device a portion of the image while covering a remaining portion of the image using at least a part of the mask.

44 Claims, 21 Drawing Sheets

(56) References Cited

U.S. PATENT DOCUMENTS

| | | | |
|---|---|---|---|
| 2012/0032979 A1* | 2/2012 | Blow | G06F 3/0488 345/647 |
| 2012/0098639 A1* | 4/2012 | Ijas | G06F 3/04883 340/5.51 |
| 2012/0249585 A1* | 10/2012 | Ohkawa | G06F 3/04883 345/629 |
| 2013/0076764 A1* | 3/2013 | Yada | H04L 12/1827 345/520 |
| 2013/0093707 A1* | 4/2013 | Park | G06F 21/31 345/173 |
| 2013/0194301 A1* | 8/2013 | Robbins | G06F 21/60 345/629 |
| 2013/0201106 A1* | 8/2013 | Naccache | G06F 3/0488 345/158 |
| 2013/0311922 A1* | 11/2013 | Park | G06F 3/0481 715/769 |
| 2013/0321452 A1* | 12/2013 | Kawalkar | G09G 3/20 345/629 |
| 2014/0078172 A1* | 3/2014 | Systrom | G06F 3/04883 345/629 |
| 2014/0118222 A1* | 5/2014 | Barrett | H04M 1/7253 345/2.2 |
| 2014/0176562 A1* | 6/2014 | Somerfield | G06T 11/203 345/443 |
| 2014/0191970 A1* | 7/2014 | Cho | G06F 3/0488 345/173 |
| 2014/0245202 A1* | 8/2014 | Yoon | G06F 3/0482 715/765 |
| 2014/0282159 A1* | 9/2014 | Lee | G06F 3/0481 715/768 |
| 2014/0283112 A1* | 9/2014 | Wang | G06F 3/04883 726/27 |
| 2014/0355962 A1* | 12/2014 | Kim | G06T 11/60 386/282 |
| 2015/0007351 A1* | 1/2015 | Janajri | G06F 3/0488 726/30 |
| 2015/0180998 A1* | 6/2015 | Cho | G06F 3/0482 715/745 |
| 2015/0242651 A1* | 8/2015 | Loader | G06F 3/04886 726/27 |
| 2015/0268744 A1* | 9/2015 | Au | G06F 3/0488 345/173 |
| 2015/0281158 A1* | 10/2015 | Grinspan | G06F 3/04842 715/753 |
| 2015/0356304 A1* | 12/2015 | You | G06F 3/04842 726/26 |

* cited by examiner

USER INTERFACES AND METHODS FOR DISPLAYING CONTENT

FIELD

The field of the subject disclosure relates to user interfaces, and more particularly, to user interfaces and associated methods for displaying content.

BACKGROUND

Electronic devices with screens have been used to display content for viewing by users. Sometimes, a user may use an electronic device in public for viewing content. However, in some cases, the content viewed may involve privacy information (e.g., bank statement, credit report, bills, etc.), confidential information, personal information, sensitive information, or any of other information that the user may not want people in the public to see.

Applicant of the subject disclosure determines that it may be desirable to provide user interfaces and methods for allowing users to view content in the public while preventing viewing by people in the public.

SUMMARY

A user interface method includes: obtaining an image; obtaining a mask; receiving a user input at a device, the user input indicating that a portion of the image is desired to be viewed by a user; and in response to the user input, displaying on a screen of the device a portion of the image while covering a remaining portion of the image using at least a part of the mask.

Optionally, the screen of the device is a touchscreen; and the user input is resulted from the user touching a portion of the screen to prescribe a reference position and a viewing window for viewing the portion of the image, wherein the viewing window has a size that is smaller than a size of the image, and the viewing window is at a pre-determined position relative to the reference position prescribed by the user touching the portion of the screen.

Optionally, the method further includes receiving an input from the user at the device resulted from the user swiping his/her finger across at least a part of the screen along a trajectory; and moving the viewing window in the trajectory that corresponds with the input to display different portions of the image.

Optionally, the method further includes: receiving an additional user input at a device, the additional user input indicating that an entirety of the image is desired to be viewed by the user of the device; and in response to the additional user input, displaying on the screen of the device the entirety of the image.

Optionally, the additional user input is resulted from the user touching a dedicated area of a masked image or making a pre-defined maneuver pattern with one or more fingers.

Optionally, the method further includes: receiving an additional user input at a device, wherein the additional user input is resulted from the user touching a dedicated area of a masked image or making a pre-defined maneuver pattern with one or more fingers; and in response to the additional user input, executing a program that comprises user input instructions. In some embodiments, the user input instructions may be instructions entered to the device using a user interface of the device. For example, a user of the device may enter the user input instructions into the device using the user interface of the device.

Optionally, the act of obtaining the mask is performed by the device receiving the mask wirelessly or through a wired connection.

Optionally, the act of obtaining the mask is performed by the device retrieving the mask from a non-transitory medium in the device.

Optionally, the method further includes providing a plurality of masks for selection by the user, and wherein the act of obtaining the mask comprises receiving an input from the user for selecting one of the masks.

Optionally, a transparency of the mask is configurable, and the method further comprises receiving an input from the user to configure the transparency of the mask.

Optionally, a size and/or a shape of the portion is configurable, and the method further comprises receiving an input from the user to configure the size and/or the shape of the portion.

Optionally, the method further includes transmitting a signal to another device during a sync-play mode to cause an image portion that is identical to the portion of the image to be displayed on a screen of the other device.

Optionally, the signal comprises the user input.

Optionally, the signal comprises a screen display duplication signal.

Optionally, the signal comprises instructions, which when executed by the other device, will cause the other device to create the image portion, or to copy the portion of the image as the image portion, for display at the other device.

Optionally, the device comprises a cell phone, a smart phone, an iPhone®, a PDA, a BlackBerry®, an iPad®, a Mini-iPad®, a tablet, a computer screen, a television(TV) screen or a digital camera.

Optionally, the user is a user of the device, and the user input is from the user of the device.

Optionally, the method further includes transmitting the user input to another device that is in communication with the device through a wired or wireless network.

Optionally, the user is a user of another device, and the user input is from the other device that is in communication with the device through a wired or wireless network.

A device includes: a non-transitory medium storing an image and a mask; a processing unit to receive a user input, the user input indicating that a portion of the image is desired to be viewed by a user; and a screen operable by the processing unit to display a portion of the image in response to the user input while covering a remaining portion of the image using at least a part of the mask.

Optionally, the screen of the device is a touchscreen; and the user input is resulted from the user touching a portion of the screen to prescribe a reference position and a viewing window for viewing the portion of the image, wherein the viewing window has a size that is smaller than a size of the image, and the viewing window is at a pre-determined position relative to the reference position prescribed by the user touching the portion of the screen.

Optionally, the processing unit is configured to receive an input from the user resulted from the user swiping his/her finger across at least a part of the screen along a trajectory; and wherein the processing unit is configured to operate the screen to move the viewing window in the trajectory that corresponds with the input to display different portions of the image.

Optionally, the processing unit is configured to receive an additional user input, the additional user input indicating that an entirety of the image is desired to be viewed by the user of the device; and wherein the processing unit is configured to operate the screen to display the entirety of the image in response to the additional user input.

Optionally, the additional user input is resulted from the user touching a dedicated area of a masked image or making a pre-defined maneuver pattern with one or more fingers.

Optionally, the processing unit is configured to receive an additional user input resulted from the user touching a dedicated area of a masked image or making a pre-defined maneuver pattern with one or more fingers; and wherein the processing unit is configured to execute a program that comprises user input instructions in response to the additional user input. In some embodiments, the user input instructions may be instructions entered to the device using a user interface of the device. For example, a user of the device may input the user input instructions into the device using the user interface of the device.

Optionally, the device further includes a wireless receiver for receiving the mask wirelessly or a connector for receiving the mask through a wired connection.

Optionally, the non-transitory medium stores a plurality of masks for selection by the user, and wherein the mask is a selected one of the plurality of masks.

Optionally, a transparency of the mask is configurable.

Optionally, a size and/or a shape of the portion is configurable.

Optionally, the processing unit is configured to generate a signal for transmission to another device during a sync-play mode to cause an image portion that is identical to the portion of the image to be displayed at the other device during the sync-play mode.

Optionally, the signal comprises the user input.

Optionally, the signal comprises a screen display duplication signal.

Optionally, the signal comprises instructions, which when executed by the other device, will cause the other device to create the image portion, or to copy the portion of the image as the image portion, for display at the other device.

Optionally, the device comprises a cell phone, a smart phone, an iPhone®, a PDA, a BlackBerry®, an iPad®, a Mini-iPad®, a tablet, a computer screen, a television(TV) screen, or a digital camera.

Optionally, the user is a user of the device, and the processing unit is configured to receive the user input from the user of the device.

Optionally, the method further includes transmitting the user input to another device that is in communication with the device through a wired or wireless network.

Optionally, the user is a user of another device that is in communication with the device through a wired or wireless network, and the processing unit is configured to receive the user input from the other device through the wired or wireless network.

A program product includes a non-transitory medium usable by a processing unit, the non-transitory medium having a set of stored instructions, an execution of which by the processing unit causes a process to be performed, the process comprising: obtaining an image; obtaining a mask; receiving a user input at a device, the user input indicating that a portion of the image is desired to be viewed by a user; and in response to the user input, displaying on a screen of the device a portion of the image while covering a remaining portion of the image using at least a part of the mask. By means of non-limiting examples, the program product may be a computer program product, a processor program product, etc.

Other aspects and features will be evident from reading the following detailed description.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting in the scope of the claims.

DETAILED DESCRIPTION

Figure 1:
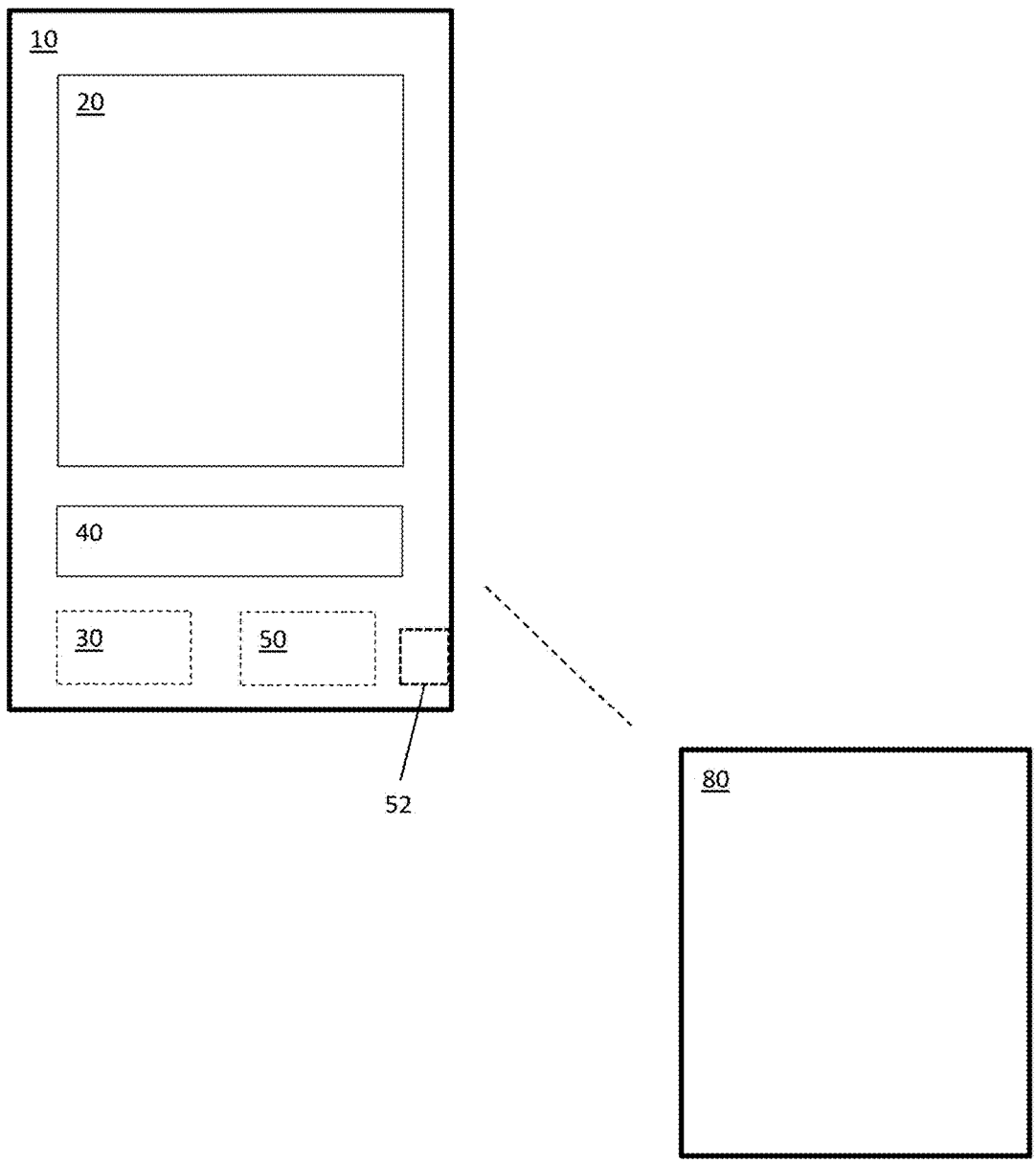
FIG. 1 illustrates a user device in accordance with some embodiments.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 illustrates a user device 10 with a user interface for displaying content in accordance with some embodiments. The device 10 has a screen 20 for displaying content, a processing unit 30, a user control 40, and a transceiver 50 (which includes a receiver and a transmitter) for wireless communication between the user device 10 and another device 80. In other embodiments, instead of, or in addition to, the transceiver 50, the device 10 may include a port/connector 52 for coupling to a cable for wired communication with the device 80. For example, in other embodiments, the device 10 may be a computer connected with Ethernet. The device 80 that the user device 10 communicates with via the transceiver 50 may be another user device, a database, a tower, a network switch, a computer, or any of other types of communication devices/systems that is capable of transmitting information. In some embodiments, the screen 20 may be a touchscreen, in which case, the user control 40 is integrated with the screen 20. In other embodiments, the user control 40 may include a keyboard, a touchpad, a joystick, a trackball, a mouse, a remote control, a remote pointer control, or any combination of the foregoing. In the illustrated embodiments, the processing unit 30 is configured to control the screen 20 to display content. The processing unit 30 may be implemented using hardware and/or software. The processing unit 30 may include one or more processors, such as an FPGA processor, an ASIC processor, a general purpose processor, a signal processor, etc. By means of non-limiting examples, the device 10 may be a cell phone, a smart phone, an iPhone®, a PDA, a BlackBerry®, an iPad®, a Mini-iPad®, a tablet, a computer screen, a TV screen, or a digital camera.

Figure 2:
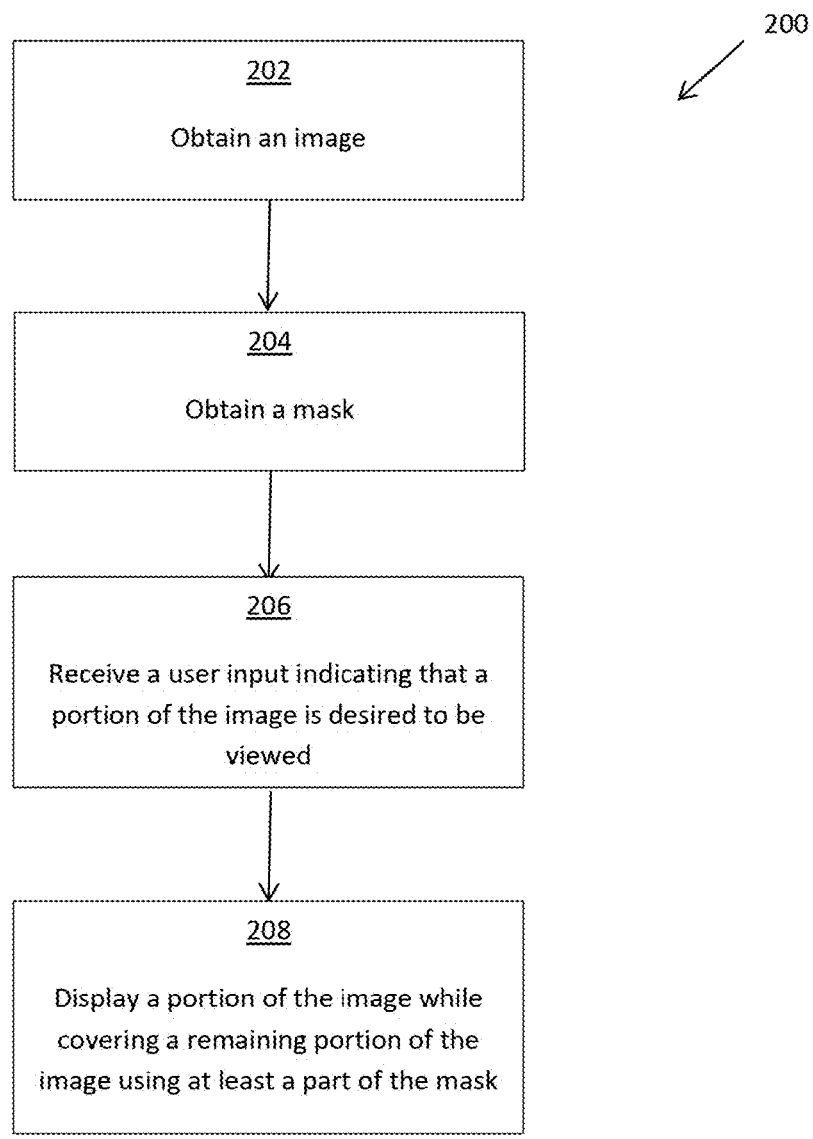
FIG. 2 illustrates a user interface method in accordance with some embodiments.
Figure 3:
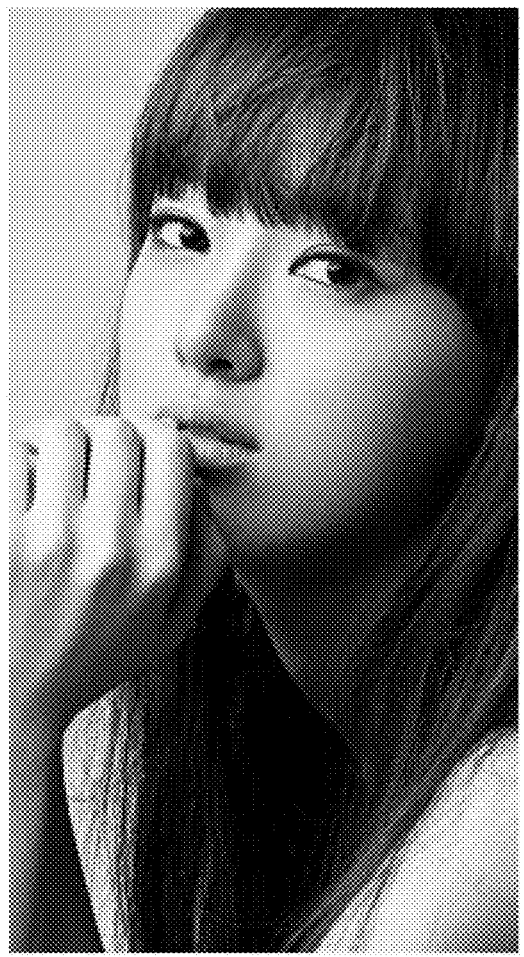
FIG. 3 illustrates an example of an image.

FIG. 2 illustrates a user interface method 200 in accordance with some embodiments. The method 200 may be performed by the user device 10. In other embodiments, the method 200 may be performed by other devices. First, an image is obtained (item 202). In some embodiments, the act of obtaining the image may be performed by the user device 10 receiving the image wirelessly or through a wired connection from a transmitting device. For example, the transmitting device may be another user device (e.g., a cell phone, a smart phone, an iPhone®, a PDA, a BlackBerry®, an iPad®, a Mini-iPad®, a tablet, a computer screen, a TV screen, or a digital camera). Alternatively, the transmitting device providing the image may be a server. In other embodiments, the act of obtaining the image may be performed by the processing unit 30 of the user device 10 retrieving the image from a non-transitory medium in the user device 10. FIG. 3 illustrates an example of an image 300 that may be obtained by the user device 10. The image 300 is illustrated as a picture in the example. However, it should be noted that the image 300 may be any content that is desired to be displayed. By means of non-limiting examples, the image 300 may be a pdf document, a webpage, a photograph, a frame, a video, a web link, etc. The image 300 may be any multimedia information or document in any format. Also, the image 300 may or may not be displayed to cover an entirety of the screen 20. For example, in some embodiments, the image 300 may be a photograph displayed in the entire screen 20. In other embodiments, the image 300 may occupy only a portion of the entire screen 20. For examples, the image 300 may be a portion in a window/frame, one or more texts, one or more fields for presenting content, etc.

Figure 4:
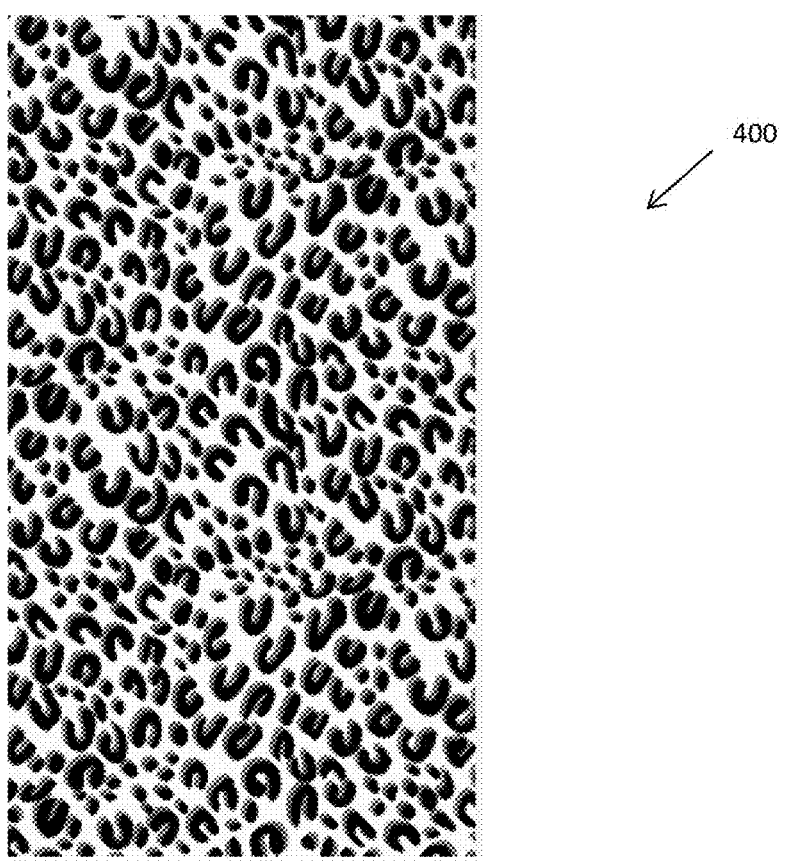
FIG. 4 illustrates an example of a mask.

Returning to FIG. 2, next a mask is obtained (item 204). In some embodiments, the act of obtaining the mask may be performed by the user device 10 receiving the mask wirelessly or through a wired connection from a transmitting device. In other embodiments, the act of obtaining the mask may be performed by the processing unit 30 of the user device 10 retrieving the mask from a non-transitory medium in the user device 10. FIG. 4 illustrates an example of a mask 400 that may be obtained by the user device 10. The mask 400 is configured to mask a part or an entirety of an image to be displayed at the user device 10. The mask 400 is illustrated as an image in the example. However, the mask 400 may be any content. By means of non-limiting examples, the mask 400 may be a pdf document, a webpage, a photograph, a frame, a video, a web link, etc. The mask 400 may be any multimedia information or document in any format. Also, it should be noted that the mask 400 may be any information (e.g., image data, mask configuration data, transparency alpha value, etc.), which when processed by a processing unit, is capable of masking an image. Thus, as used in this specification, the term "mask" is not necessarily limited to an image, and may be any content that is displayed over, displayed below, in lieu of, or combinable with, the image in order to prevent displaying of the full image in its original form. The term "mask" may also, in the alternative, refer to any data for processing with an image to create a composite or modified image that looks different from the original image. In some cases, a masked image has no resemblance as the original image 300. In other cases, a masked image may have some resemblance as the original image 300, but is different from the image 300 in its original form.

Returning to FIG. 2, next, a user input is received at a device (item 206). The user input indicates that a portion of the image is desired to be viewed by a user of the device 10. In response to the user input, the processing unit 30 of the user device 10 controls the screen 20 to display a portion of the image while covering a remaining portion of the image using at least a part of the mask (item 208).

Figure 5:
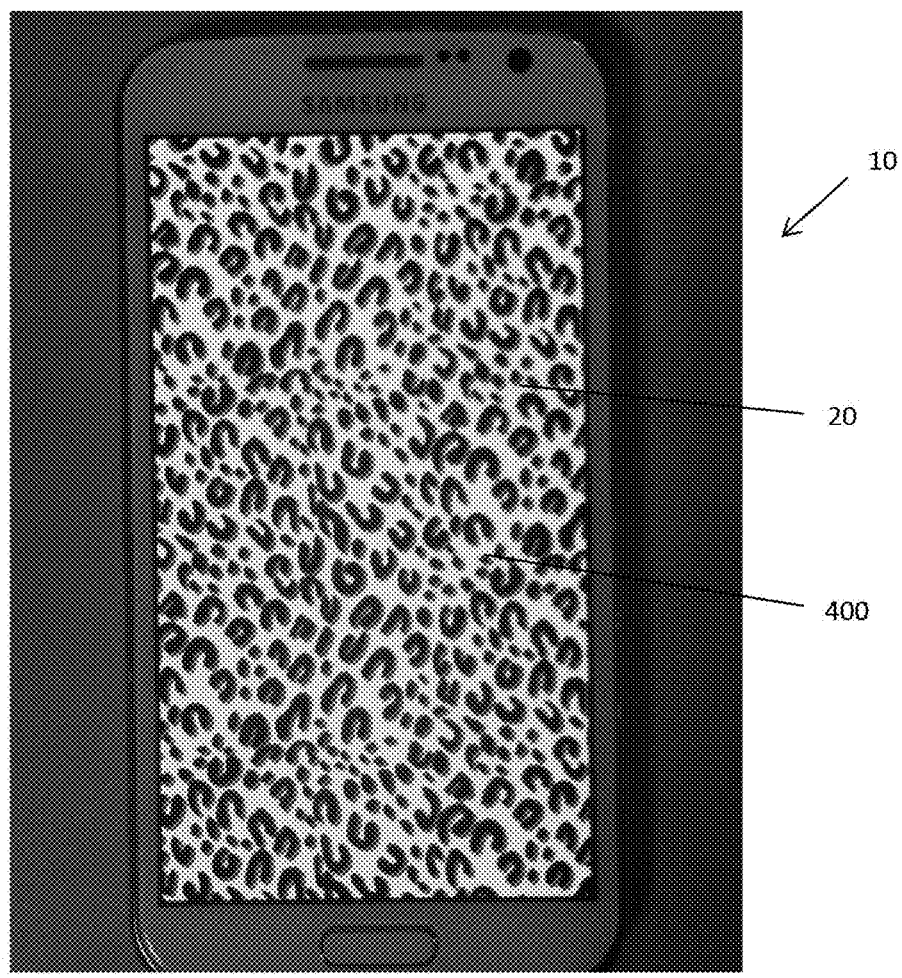
FIG. 5 illustrates an example of a mask covering an image as displayed in a screen of a user device in accordance with some embodiments.
Figure 6A:
FIG. 6A illustrates an example of a portion of an image being displayed while a remaining portion of the image is masked.

FIGS. 5-6 illustrate the concept of items 206, 208. In particular, FIG. 5 illustrates the mask 400 covering the image 300 in the screen 20 of the user device 10 in accordance with some embodiments. The mask 400 covers the entirety of the image 300 because a user of the user device 100 has not selected any portion of the image 300 for viewing. However, as shown in FIG. 6A, the user device 10 may display a portion 610 of the image 300 in response to the user touching an area of the screen 20 while a remaining portion of the image 300 is masked. In particular, the screen 20 of the user device 10 is a touchscreen, and an user input is generated from the user touching a portion of the screen 20 to prescribe a reference position (X, Y) 600 and a viewing window 602 for viewing a portion 610 of the image 300, wherein the viewing window 602 has a size that is smaller than a display size of the image 300, and the viewing window 602 is at a pre-determined position relative to the reference position 600 prescribed by the user touching the portion of the screen 20. In the illustrated embodiments, the processing unit 30 is configured to use the fingertip location information to extract and reveal part of the corresponding image 300, while a remaining part of the image 300 is covered using the mask 400.

Figure 6B:
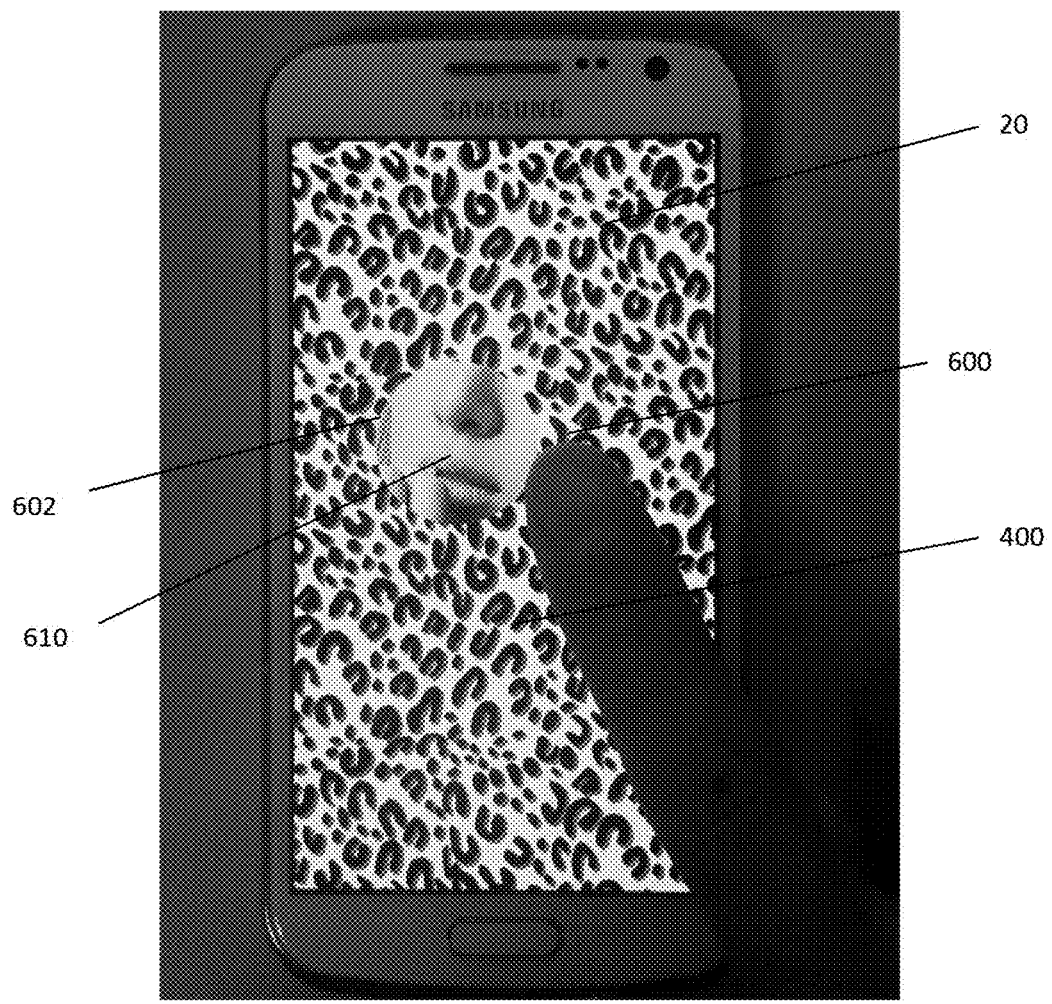
FIG. 6B illustrates another example of a portion of an image being displayed while a remaining portion of the image is masked.

The user may touch another portion of the screen 20 to prescribe another reference position 600 (FIG. 6B). As a result, the viewing window 602 is moved to another position 600 that corresponds with the reference position to display another portion 610 of the image 300, while a remaining portion of the image 300 is masked by the mask 400.

In the above example, the viewing window 602 is always offset to the left of the position touched by the user's fingertip. This allows the portion 610 of the image 300 to be viewed within the viewing window 602 without the fingertip obstructing the view. In other embodiments, the viewing window 602 may be at other positions relative to the position 600 touched by the user's finger. In some embodiments, to make sure all areas, except certain designated locations, of the image are selectable and viewable, proper margin handling might be necessary. For example, the distance of the offset may be automatically reduced and eventually set to zero if and when a reference position is within a certain prescribed distance to the image boundary and is moved towards the edge of the image boundary.

In some embodiments, items 206 and 208 may be repeated continuously. For example, in some embodiments, the user of the user device 10 may swipe his/her finger across at least a part of the screen 20 of the user device 10 along a trajectory to generate an input. The input may be represented by a plurality of reference positions (touched positions) 600 that lie along the length of the trajectory. In response to the reference positions 600, the processing unit 30 of the user device 10 moves the viewing window 602 in the trajectory that corresponds with the input (i.e., the reference positions 600 in the input) to display different portions of the image 300. In some embodiments, the displaying of the different portions of the image 300 may be performed in substantially real-time while the user moves his/her finger across the screen 20. For example, when the user's finger is at a certain position 600 on the screen 20, the user device 10 may display the portion 610 of the image 300 corresponding to that position 600 within a short time (e.g., within 1 second, and more preferably within 0.5 second, and even more preferably within 0.1 second, and even more preferably within a much less time that the overall processing speed allows) after the user's finger has touched that position 600 on the screen. Thus, the viewing window 602 showing part of the image 300 follows the fingertip movement on the touch screen 20 in substantially real time. In the above embodiments, when the corresponding part of the image 300 is extracted from underneath the mask 400 for display, it can be displayed as in-place revelation. That is, the different parts of the image 300 may be extracted and displayed continuously over a period of time in response to finger movement, as long as the fingertip is touching the screen 20 and movement of the fingertip is detected. In other embodiments, instead of displaying the portion of the image 300 in an in-place revelation configuration, the portion of image 300 may be displayed at any other selected location in the screen 20 and in other manners. For example, in some embodiments, the portion 610 of the image 300 revealed or extracted by the viewing window 602 may be displayed inside the viewing window 602 (hence in-place). In other embodiments, the portion 610 may be displayed in a dedicated display window on the screen 10 of the user device 10, or even on a different device that is in communication with the user device 10.

Figure 6C:
FIG. 6C illustrates a display window with a close button.

In the above embodiments, the viewing window 602 will stay on as long as the finger is touching the screen 20, and when the finger is lifted away from the screen 20, the viewing window 602 disappears, and the entire masked image is displayed. In other embodiments, the viewing window 602 displaying the partial image may stay on (may become floating) after the finger is lifted off of the touch screen. For example, the portion 610 of the image 300 may float to prompt for user input. In some embodiments, the viewing window 602 displaying the partial image is floating in response to the user touching the touchscreen once. In other embodiments, the viewing window 602 displaying the partial image may become floating in response to the user double-tapping on a certain position (e.g., reference position, based on which the viewing window 602 is displayed), or by pressing on a certain position longer than a time threshold. In addition, in some embodiments, after the viewing window 602 is displayed on the screen and is floating, a close button 603 may be presented in association with the viewing window 602 (FIG. 6C). The floating viewing window 602 may be closed through the close button 603 on the viewing window 602, or by the user touching another location on the masked image.

Also, in some embodiments, the displaying of the viewing window 602 at certain locations may take priority over other locations. For example, when the user selects (e.g., by double-tapping) certain location on the screen (which may be an arbitrary position on the masked image, or a certain pre-defined position, such as a lower left corner), the viewing window 602 for the location with the highest priority will pop up. In such cases, the actual position being touched by the user's finger may not be the reference position associated with the viewing window 602 being popped up. In other embodiments, the user may select a certain location (X, Y), and in response, the processing unit 30 then determines whether there is any position with higher priority within a region surrounding the selected position (X, Y). For example, the processing unit 30 may determine whether there is any position with higher priority within a 5 pixels radius surrounding the selected position (X, Y). If so, the processing unit 30 then operates the display to display a viewing window 602 for the position with the higher priority. This is the case even though the position with the higher priority is not the position touched by the user's finger.

In addition, in some embodiments, the viewing window 602 of a given masked image may change its size, shape, and or form, depending on the reference position and/or priority. For example, a device (e.g., a user device 10A) may include a user interface similar to that of FIG. 9A to allow a user to select and/or group one or more reference locations, assign one or more priorities for the respective one or more reference locations (or one or more groups of reference locations), and configure the corresponding associated mask and viewing window. Thus, the sender of the image 300 may use the user device 10A to select one or more hot spots (portions of partial image) on the image 300 for priority showing. After the receiving user device 10B receives the image 300 from the user device 10A, the viewer of the user device 10B may quickly tap (for example, shorter than normal pressing and move time) on any location on the masked image. In response to such maneuver, the processing unit at the user device 10B may operate the screen of the user device 10B to display a corresponding first viewing window of the first hot spot. The viewer of the user device 10B may quickly tap again on any location on the masked image. In response to such maneuver, the processing unit at the user device 10B may operate the screen of the user device 10B to display a corresponding second viewing window of the second hot spot (if there are multiple hot spots), and so on. In some embodiments, the form of the viewing window may be changed. For example, in some embodiments (following the above example), when the viewer of the user device 10B quickly tap again on any location on the masked image, the processing unit in the user device 10B may process the input and to control the display so that a composite window is presented to the user, wherein the composite window may be obtained by grouping different viewing windows (the ones that have been selected by the user) together. In some cases, more than one hot spot can be displayed in one composite viewing window in the above example.

Figure 7:
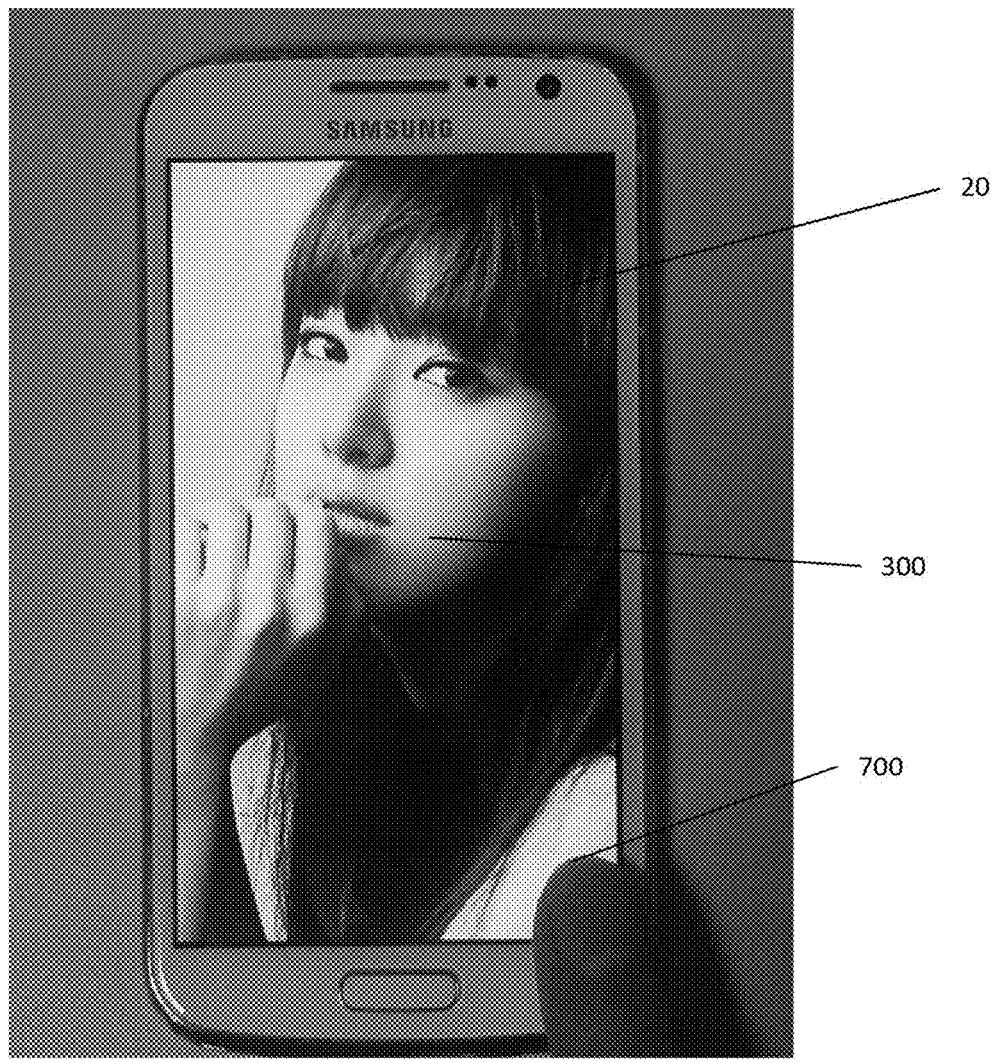
FIG. 7 illustrates an example of an image being displayed in its entirety.

In some embodiments, a dedicated area at the masked image may be reserved for allowing a user to view the entirety of the image 300. For example, in some embodiments, the lower right corner of the masked image may be selected by the user (e.g., by the user touching the lower right corner of the masked image), and in response to such selection by the user of the user device 10, the processing unit 30 of the user device 10 then controls the screen 20 to display the entirety of the image 300. FIG. 7 illustrates an example of the image 300 being displayed in its entirety when the lower right corner of the masked image is selected by the user of the user device 10. In particular, the processing unit 30 of the user device 10 receives a user input (resulted from the user touching the dedicated area 700 at the lower right corner of the masked image) indicating that an entirety of the image is desired to be viewed by the user of the device, and in response to the user input, controls the screen 20 to display the entirety of the image 300.

In other embodiments, the dedicated area at the masked image may be at other positions with respect to the masked image. For examples, in other embodiments, the dedicated area for allowing the user to control viewing the entirety of the image 300 may be at the upper right corner, upper left corner, lower left corner, top edge, bottom edge, right edge, or left edge of the masked image.

In some embodiments, as soon as the finger is lifted away from the dedicated area on the masked image, the entire mask 400 may come back on to hide the full image 300. Also, a switch may be implemented to allow the user to view the full image 300 even after the finger is lifted away from the dedicated area on the masked image. For example, in some cases, the user may tap the dedicated area once (or twice) to view the image 300, and may tap the dedicated area once (or twice) again to hide the image 300 using the mask 400.

Figure 8:
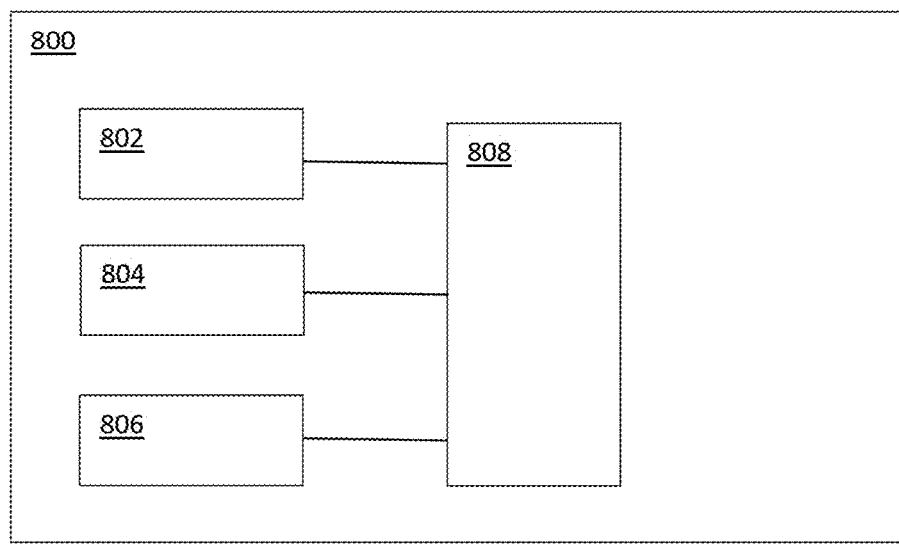
FIG. 8 illustrates a processing unit of a user device to implement the method of FIG. 2 in accordance with some embodiments.

FIG. 8 illustrates a processing unit 800 configured to implement the method of FIG. 2 in accordance with some embodiments. In some embodiments, the processing unit 800 may be the processing unit 30 of the user device 10 of FIG. 1. The processing unit 800 has an image obtaining unit 802, a mask obtaining unit 804, a user input receiving unit 806, and a display control unit 808. The image obtaining unit 802 is configured to obtain an image (e.g., the image 300). The mask obtaining unit 804 is configured to obtain mask data (e.g., mask image data, mask configuration data, transparency alpha value, etc.). The user input receiving unit 806 is configured to obtain a user input indicating that a portion of the image 300 is desired to be viewed by a user of the device 10. The display control unit 808 is configured to, in response to the user input, control the screen 20 of the device 10 to display a portion of the image 300 while covering a remaining portion of the image 300 using at least a part of the mask 400. In some embodiments, each of the image obtaining unit 802, the mask obtaining unit 804, the user input receiving unit 806, and the display control unit 808 may be a module (e.g., a software module) running on a processor. For example, the unit 802/804/806/808 may be implemented as a function that is a part of a processor program. In other embodiments, at least a part of the unit 802/804/806/808 may be implemented with hardware (e.g., circuitry, such as an integrated circuit, or hardware component).

Figure 9A:
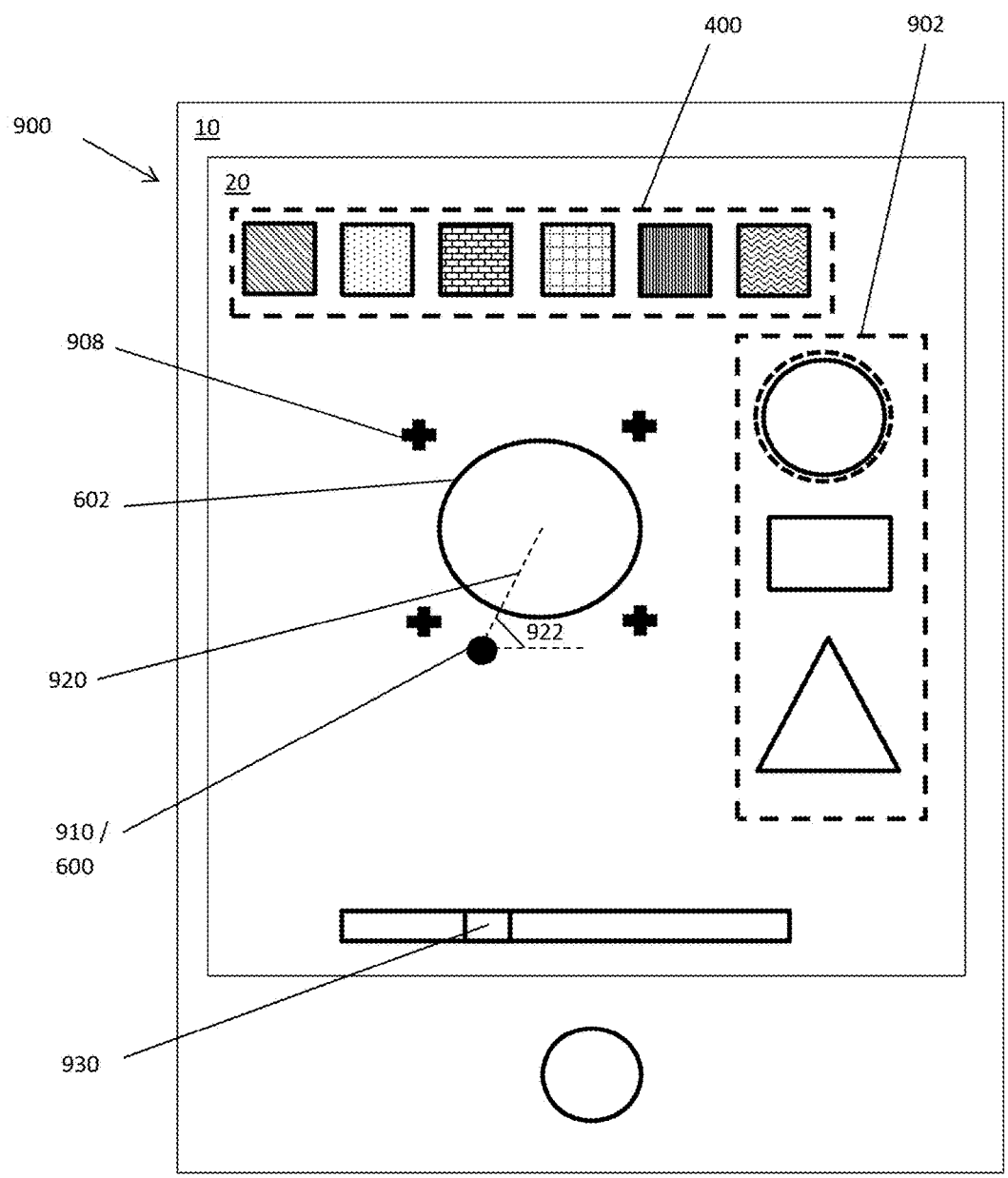
FIG. 9A illustrates a user interface for allowing a user to configure one or more aspects of a mask.

In some embodiments, one or more aspects of the mask 400 may be configurable by the user of the user device 10. For example, the size and/or shape of the display window 602 in the mask 400 may be user configurable. Also, the position of the display window 602 relative to a reference position (which may be any position selected by a user) may be user configurable. In addition, a user may select one of a plurality of masks 400 for masking a certain image 300. Furthermore, a transparency of a mask 400 may also be user configurable. FIG. 9A illustrates a user interface 900 for allowing a user to configure one or more aspects of a mask. As shown in the figure, the user interface 900 may include a plurality of masks 400 for allowing a user to choose from. The selected mask may be for hiding a certain image, for hiding a group of images, or for hiding all images (in which case, the selected mask is a default mask).

Figure 9B:
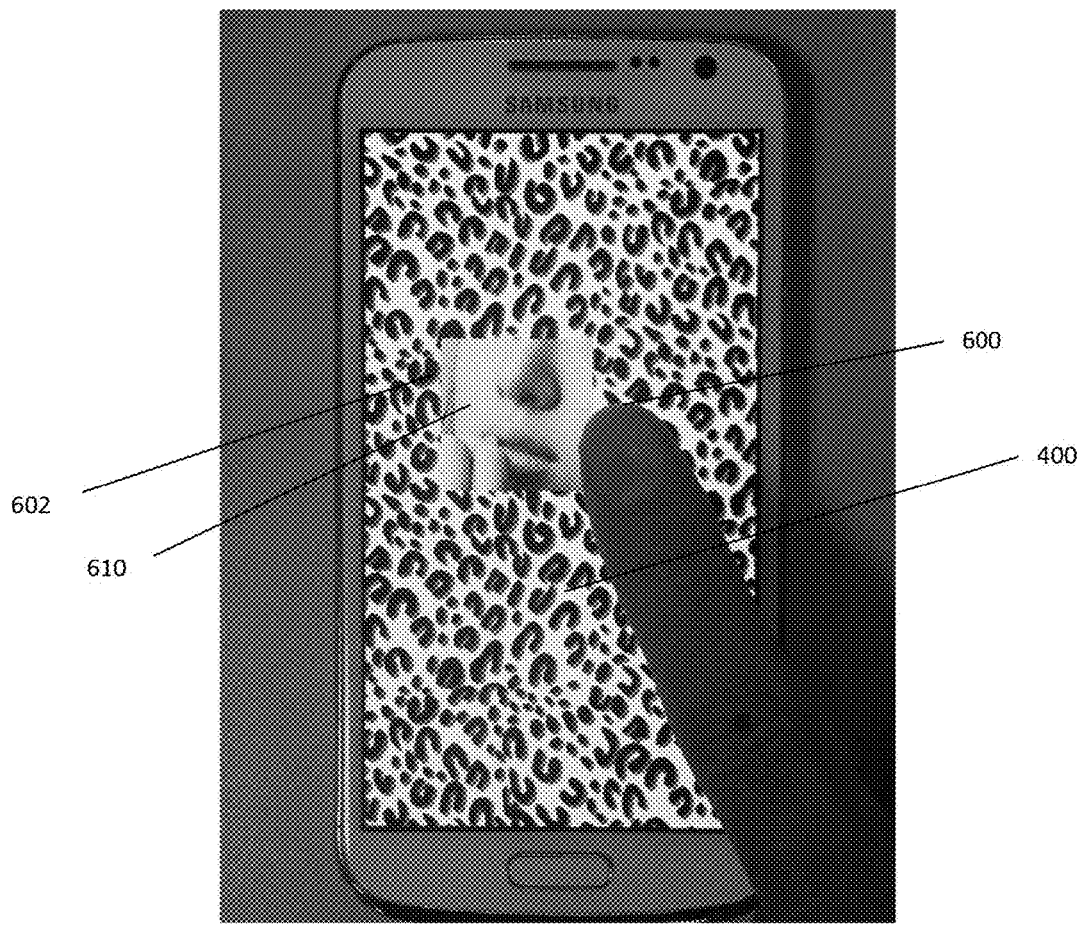
FIG. 9B illustrates a display window having a square shape.

Also, once a mask 400 has been selected, the shape of a viewing window 602 associated with the mask 400 may be selected from a plurality of available shapes 902. FIG. 9B illustrates a viewing window 602 having a square shape if the shape of the viewing window 602 is selected by the user to be a square. In other embodiments, the shape of the viewing window 602 may be arbitrary set by the user, and may be any user-configurable shape.

In addition, once a shape 902 of a viewing window 602 has been selected, the user interface 900 provides one or more drag-points 908 for allowing a user to change a shape and/or a size of the selected viewing window 602. Furthermore, an offset position of a viewing window 602 relative to a reference position 600 may be adjusted by the user selecting the viewing window 602 and moving it relative to marker 910 representing the reference position 600, thereby changing a distance 920 between the reference position 600 and a center of the viewing window 602, and/or a direction 922 of the viewing window 602 relative to the reference position 600. For example, the user may move the viewing window 602 so that its center is at the marker 910. With such configuration, when the user places his/her finger at a certain position (the reference position 600) on the screen, the viewing window 602 will be centered at that reference position 600. In such case, part of the image in the displaying window 602 will be blocked by the finger when the finger is touching the screen 20 but is not yet moving. When the finger is moving around the screen 20 quickly, the displaying window 602 will follow the movement of the finger. In some cases, due to a processing delay, the display center will not be in full sync with the reference position of the finger but seems to be one step behind of the reference point, thus rendering the effect that the display window 602 is not blocked by the finger. In another example, the user may move the viewing window 602 so that its center is above and offset from the marker 910. With such configuration, when the user places his/her finger at a certain position (the reference position 600) on the screen, the viewing window 602 will be above and offset from that reference position 600. This prevents the finger from blocking the portion 610 of the image 300 being displayed in the viewing window 602. In some embodiments, to make sure all areas, except certain designated locations, of the masked image are selectable and viewable, proper margin handling might be necessary. For example, the distance 920 of the offset will be automatically reduced and eventually set to zero if and when a reference position is within a certain prescribed distance from the image display boundary and is moved towards to edge by the user's finger.

Figure 9C:
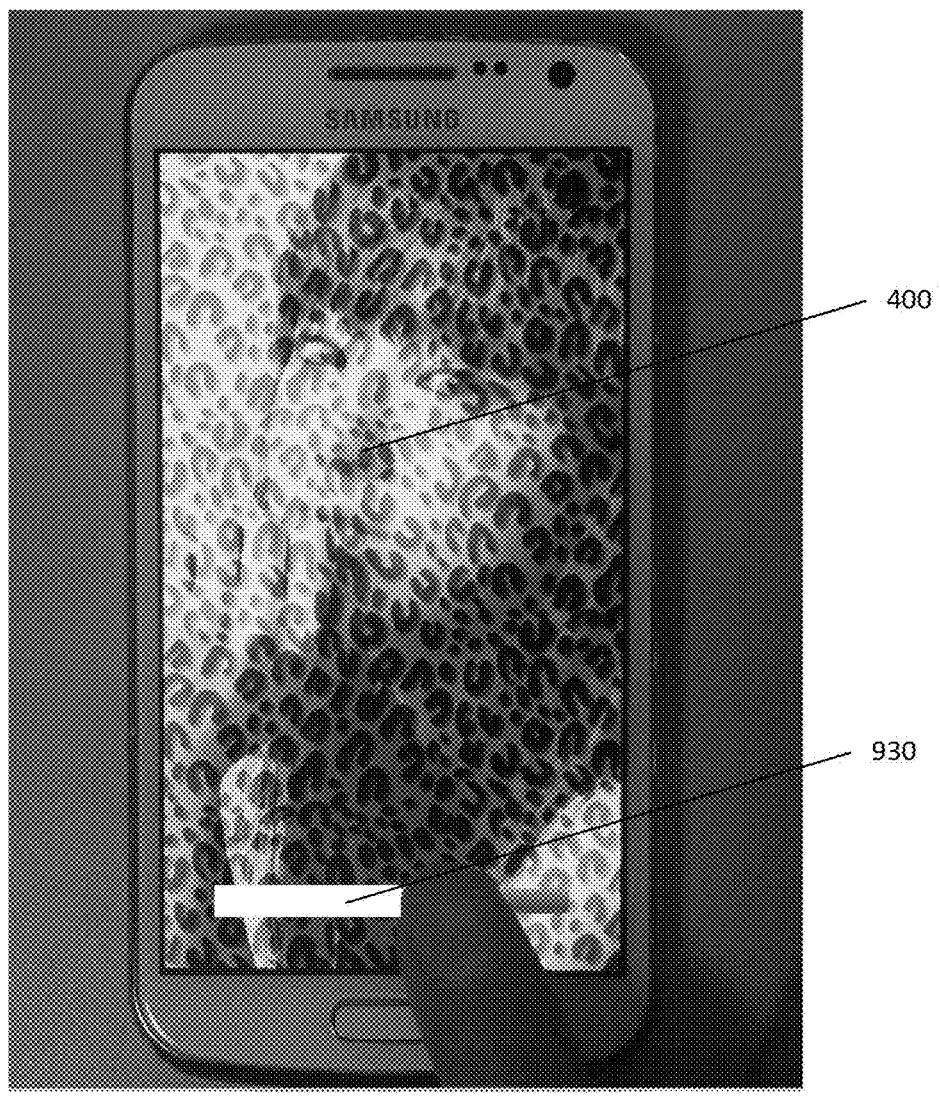
FIG. 9C illustrates an effect on the masked image when a transparency is adjusted to a value.
Figure 9D:
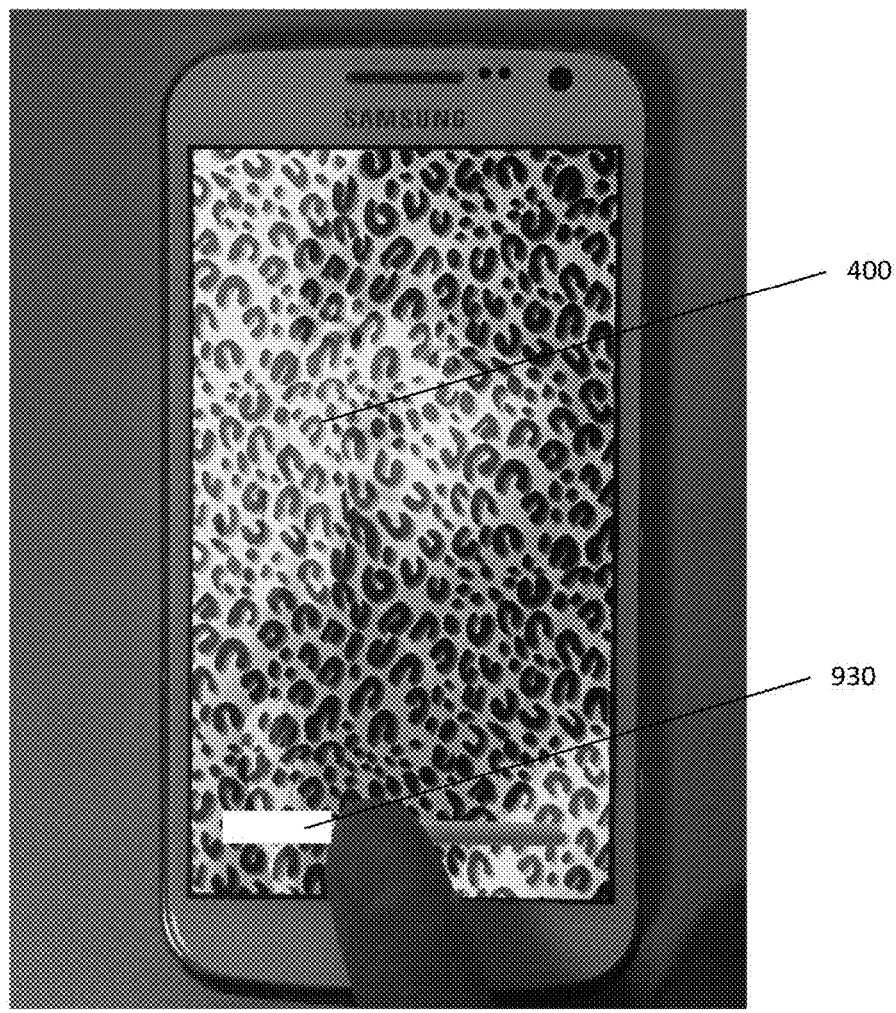
FIG. 9D illustrates an effect on the masked image when a transparency is adjusted to another value.

In addition, as shown in FIG. 9A, the user interface 900 may have a transparency control 930 for allowing a user to configure a transparency of a mask 400. Alternatively, a transparency control 930 may be provided at an area dedicated in the masked image to allow the viewer to adjust the transparency alpha value. In some embodiments, if a blending algorithm is used to create a masked image, the masked image may look completely different from the original image. Alternatively, the masked image may have some similarities as the original image (e.g., it may resemble a foggy window), in which case, the transparency control 930 may also be provided together with a mask 400 when the user is viewing the image. For example, the transparency control 930 may be positioned at the bottom of the masked image, or at a side of the masked image. FIG. 9C illustrates an effect on the masked image when a transparency is adjusted to a value using the transparency control 930 that is presented together with the masked image. FIG. 9D illustrates an effect on the masked image when a transparency is adjusted to another value using the transparency control 930. In other embodiments, the transparency control 930 at the masked image may be selectively made invisible by the user (e.g., by entering a command, such as through a finger maneuvering, a voice command, or a keyboard). Also, in some embodiments, an image (e.g., a pre-viewing image) like that shown in FIG. 9C or 9D may be displayed next to the transparency control 930 when the user interface 900 of FIG. 9A is being used by the user to configure attributes of the mask 400, so that the user can see the effect of the adjusted transparency on a masked image.

In the above embodiments, the user interface 900 is described as being presented on the user's user device 10 for allowing the user (viewer) to adjust the mask 400. In other embodiments, the user interface 900 may also be presented on a sending device (the one that sends the image 300 to the user device 10) so that the person (sender) using the sending device may configure the mask 400.

In some embodiments, when the user device 10 receives the image 300 from the sender device 80 (see FIG. 1), the image 300 already has the mask 400 associated with it. In such cases, when the device 80 transmits the image 300 to the user device 10, the device 80 also transmits the associated mask 400. The device 80 may also transmit the viewing window information (e.g., the size and shape of the viewing window 602, and the pre-determined relative position between the viewing window 602 and a reference position (representing an arbitrary selected position by a user, or a pre-determined default value)) associated with the mask 400 to the user device 10. Alternatively, the viewing window information may be stored in a non-transitory medium in the user device 10. In such cases, the same viewing window information may be applied for all images and masks. After the image 300 and the mask 400 are received by the user device 10, the image 300 and the mask 400 may then be stored in a non-transitory medium in the user device 10.

In other embodiments, the mask image 400 may be already stored in a non-transitory medium of the user device 10 before the image 300 is transmitted to the user device 10. For example, the non-transitory medium of the user device 10 may store one or more masks 400. In such cases, when the image 300 is received by the user device 10, the processing unit 30 then applies one of the masks 400 (which may be a mask pre-selected by the user) to mask the image 300.

In some embodiments, the mask 400 for masking a certain image 300 may be pre-determined by a user of the user device 10. For example, the user of the user device 10 may have already selected a certain mask 400 for masking one or more images 300, and such mask 400 may be stored in the non-transitory medium of the user device 10 before the image(s) 300 are received by the user device 10. When the user device 10 receives the image(s) 300 from the sender device 80, the processing unit 30 of the user device 10 may then retrieve the pre-selected mask 400 for masking the image(s) 300.

In other embodiments, the mask 400 for masking a certain image 300 may be pre-determined by the sender device 80. For example, as similarly discussed, the sender device 80 may send the image 300 together with its associated mask 400 for masking the image 300. Alternatively, the sender device 80 may send the image 300 together with a mask identifier. In such cases, the user device 10 may already stores one or more masks 400. When the user device 10 receives the image 300 and the mask identifier from the sender device 80, the processing unit 30 at the user device 10 then retrieves the corresponding mask 400 that has the mask identifier for masking the image 300.

Also, in some embodiments, the same mask 400 may be applied by the processing unit 30 of the user device 10 for multiple images 300 received at the user device 10. In other embodiments, different images 300 may have different respective masks 400 associated with them. For example, a first mask may be processed by the processing unit 30 to mask a first image when the first image is selected by the user for display, and a second mask may be processed by the processing unit 30 to mask a second image when the second image is selected by the user for display. The masks 400 may be transmitted by the sender device 80 together with the images 300 for reception by the user device 10. Alternatively, the images 300 may have different respective mask identifiers associated therewith, and the mask identifiers are transmitted together with the respective images 300 for reception by the user device 10. In such cases, when the user device 10 receives the images 300, the processing unit 30 then retrieves the corresponding masks 400 in the non-transitory medium of the user device 10 with the mask identifiers for masking the images 300.

Also, in other embodiments, the masks 400 may be pre-determined by the user of the user device 10 before the images 300 are received by the user device 10, and may be stored in the non-transitory medium of the user device 10. In such cases, the sender device 80 does not transmit the masks nor any mask identifiers. When the user device 10 receives the images 300, the processing unit 30 of the user device 10 then applies one or more masks 400 that are pre-determined by the user of the user device 10 for masking the images 300.

Figure 10:
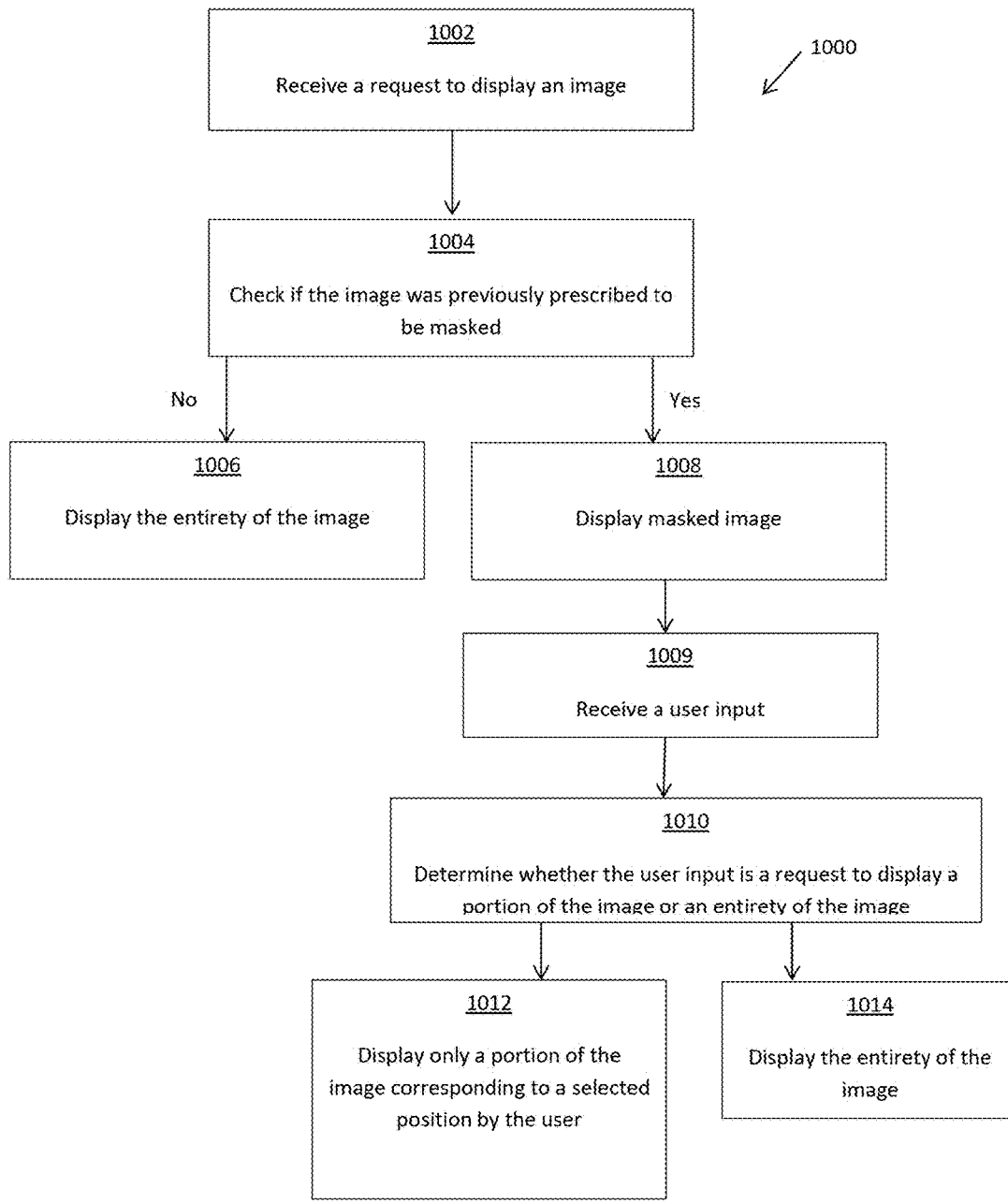
FIG. 10 illustrates a user interface method in accordance with other embodiments.

In some embodiments, when the user of the user device 10 selects a certain image 300 for display, the processing unit 30 may first check to see if the selected image 300 was previously prescribed to be masked. For example, the image 300 may have a prescription flag set to indicate that the image 300 is to be masked when displayed. If the processing unit 30 determines that the image 300 was prescribed to be masked (e.g., it has a prescription flag set to indicate such), then the processing unit 30 may provide masking feature for the image 300. If not, then the processing unit 30 may operate the display 20 to display the selected image 300 without any masking feature. FIG. 10 illustrates a user interface method 1000 in accordance with some embodiments. First, a request to display an image is received at the user device 10 (item 1002). Next, the processing unit 30 of the user device 10 checks to see if the image was previously prescribed to be masked (item 1004). If the image was not previously prescribed to be masked (e.g., the prescription flag of the image is set to indicate that the image is not to be masked), the processing unit 30 then operates the display 20 at the user device 10 to display the entirety of the image (item 1006). On the other hand, if the image was previously prescribed to be masked (e.g., there is a prescription indicating that the image is to be masked when displayed), the processing unit 30 then retrieves the mask data and uses the mask data to cover the image (item 1008). In such cases, the processing unit 30 will operate the display 20 to display the masked image by default. In some embodiments, item 1008 may be accomplished by the display 20 displaying the mask 400. In other embodiments, the processing unit 30 may create a masked image using mask data. For example, the processing unit 30 may modify the image using the mask data to create a masked image. In one implementation, the processing unit 30 may create a masked image using the image 300, mask data, and a transparency value. The masked image may resemble the original image 300, but the details of the original image 300 may not be visible (like a foggy window). Also, in some embodiments, the processing unit 30 may create a masked image by determining a composite image using the image 300 and the mask image.

Next, the processing unit 30 receives a user input (item 1009). The processing unit 30 then determines if the user input received at the user device 10 is a request to display a portion of the image, or an entirety of the image (item 1010). For example, the processing unit 30 may determine a position on the screen 20 that is touched by a user's finger. The processing unit 30 then determines whether the position is at a dedicated area (e.g., lower right corner) in the masked image for controlling display of the entire image. If the position is at the dedicated area in the masked image, then the processing unit 30 determines that the user input is to request an entirety of the image to be displayed. If the position is at any of other locations in the masked image other than the dedicated area for displaying the entire image, then the processing unit 30 determines that the user input is to request only a portion of the image to be displayed.

If the user input received at the user device 10 is a request to display only a portion of the image, the processing unit 30 then obtains the image and the mask, and operates the display 20 to display only a portion of the image in the viewing window 602 corresponding to a selected position by the user, while a remaining portion of the image is masked (item 1012). In one implementation, the processing unit 30 uses the position of the user's finger on the screen 20 to determine a position of the viewing window 602 (which is at a pre-determined position relative to the finger position). The processing unit 30 then extracts a portion of the image 300 that is at the position of the viewing window 602 and having a size and shape that are the same as those of the viewing window 602 for display on the screen 20. Item 1012 may be implemented using the method 200 of FIG. 2. On the other hand, if the user input received at the user device 10 is a request to display an entirety of the image, the processing unit 30 then operates the display 20 to display the entirety of the image (item 1014).

Figure 11:
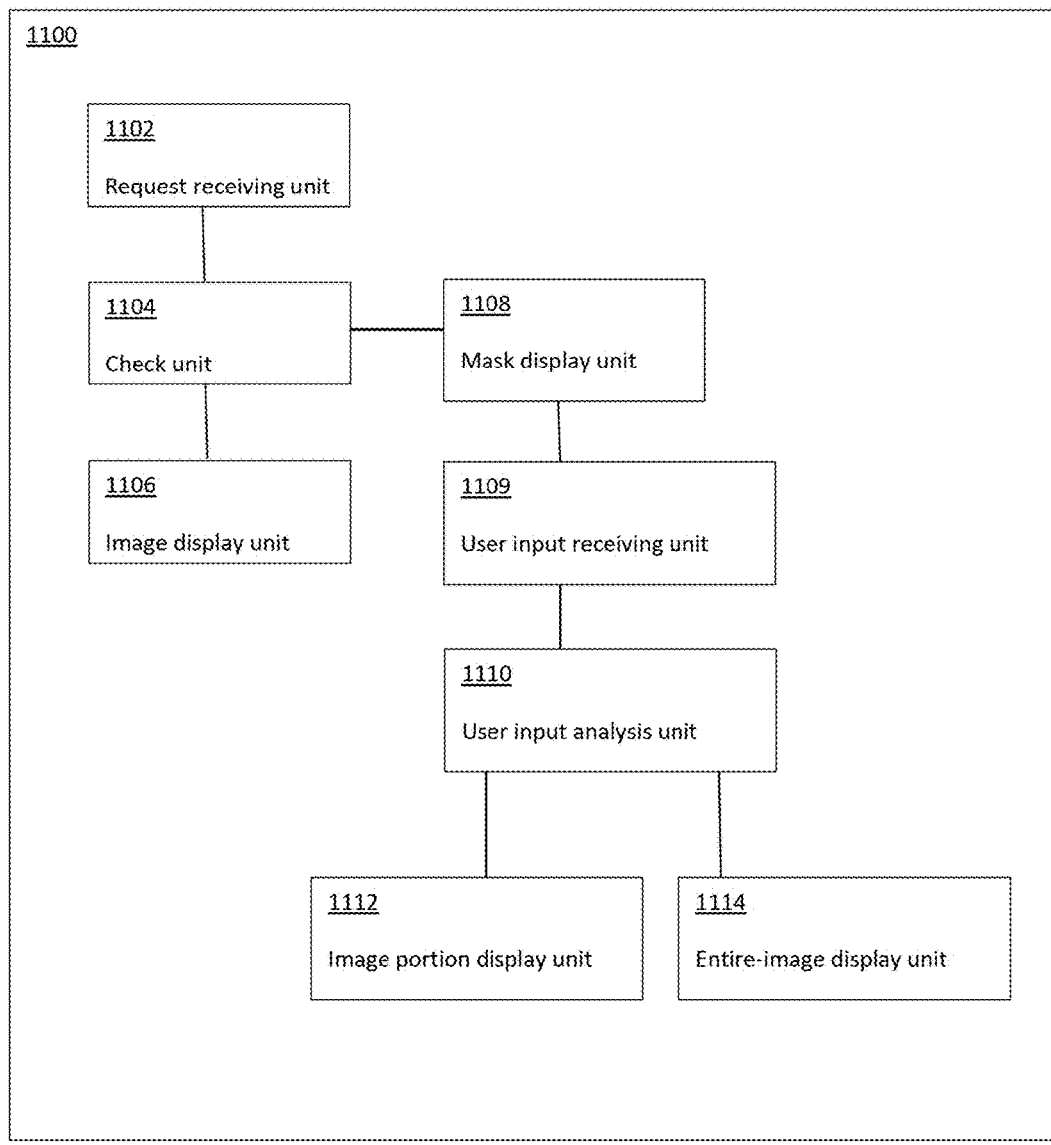
FIG. 11 illustrates a processing unit of a user device to implement the method of FIG. 10 in accordance with some embodiments.

FIG. 11 illustrates a processing unit 1100 configured to implement the method of FIG. 10 in accordance with some embodiments. In some embodiments, the processing unit 1100 may be the processing unit 30 in the user device 10 of FIG. 1. The processing unit 1100 has a request receiving unit 1102, a check unit 1104, an image display unit 1106, a masked image display unit 1108, a user input receiving unit 1109, a user input analysis unit 1110, an image portion display unit 1112, and an entire-image display unit 1114. The request receiving unit 1102 is configured to receive a request to display an image (e.g., performs item 1002 in the method 1000). The check unit 1104 is configured to check to see if the image was previously prescribed to be masked (e.g., performs item 1004 in the method 1000). For example, the check unit 1104 may check to see if the image has a prescription flag associated therewith that is set to indicate that the image is to be masked when displayed. If the image was not previously prescribed to be masked (e.g., the prescription flag may be set to indicate no masking), then the image display unit 1106 operates the display 20 at the user device 10 to display the entirety of the image (e.g., performs item 1006 in the method 1000). On the other hand, if the image was previously prescribed to be masked (e.g., the prescription flag may be set to indicate masking), the masked image display unit 1108 then retrieves the mask data and uses the mask data to cover the image (e.g., performs item 1008 in the method 1000). The user input receiving unit 1109 is configured to receive a user input (e.g., performs item 1009 in the method 1000). The user input analysis unit 1110 then determines if the user input received at the user device 10 is a request to display a portion of the image, or an entirety of the image (e.g., performs item 1010 in the method 1000). If the user input received at the user device 10 is a request to display only a portion of the image, the image portion display unit 1112 then obtains the image and the mask, and operates the display 20 to display only a portion of the image in the viewing window 602 corresponding to a selected position by the user, while a remaining portion of the image is masked (e.g., performs item 1012 in the method 1000). On the other hand, if the user input received at the user device 10 is a request to display an entirety of the image, the entire-image display unit 1114 then operates the display 20 to display the entirety of the image (e.g., performs item 1014 in the method 1000).

In some embodiments, each of the request receiving unit 1102, the check unit 1104, the image display unit 1106, the masked image display unit 1108, the user input receiving unit 1109, the user input analysis unit 1110, the image portion display unit 1112, and the entire-image display unit 1114 may be a module (e.g., a software module) running on a processor. For example, the unit 1102/1104/1106/1108/1109/1110/1112/1114 may be implemented as a function that is a part of a processor program. In other embodiments, at least a part of the unit 1102/1104/1106/1108/1109/1110/1112/1114 may be implemented with hardware (e.g., circuitry, such as an integrated circuit, or hardware component).

Although not shown, in some embodiments, the processing unit 1100 may incorporate the components of the processing unit 800 in FIG. 8. For example, in some embodiments, the processing unit 1100 may also include the image obtaining unit 802 for obtaining the image, and the mask obtaining unit 804 for obtaining mask data. Also, in some embodiments, the user input receiving unit 806 may be implemented as the user input receiving unit 1109, and the display control unit 808 may be implemented as the unit 1112 and/or unit 1114.

As discussed, in some embodiments, the user of the user device 10 may set up a mask 400 for certain image 300. In particular, if the image 300 received by the user device 10 initially does not have any mask associated with it, then the user of the user device 10 may set up a mask 400 for that image 300. For example, in some embodiments, when the user device 10 receives an image 300, the user device 10 may prompt the user to see if the user wants to set up a mask 400 for the image 300. In other embodiments, when the user of the user device 10 selects an already stored image 300 in the user device 10 for viewing, the user device 10 may also prompt the user to see if the user wants to set up a mask 400 for the image 300. In further embodiments, the user device 10 may not actively prompt the user to see if the user wants to set up a mask 400 for an image 300. Instead, the user device 10 may be configured to passively allow the user to set up a mask 400 whenever the user chooses to. In particular, the user device 10 may be configured to have a dedicated input for allowing the user to set up a mask 400 whenever a user chooses to. For example, in some embodiments, whenever a user swipe his/her finger horizontally at a bottom of the screen 20, the processing unit 30 then determines that the user wishes to set up a mask 400 and will perform a setup method. In other embodiments, the dedicated input may not be a horizontal swipe across a bottom of the screen 20, and may be other forms of user maneuvers.

Figure 12:
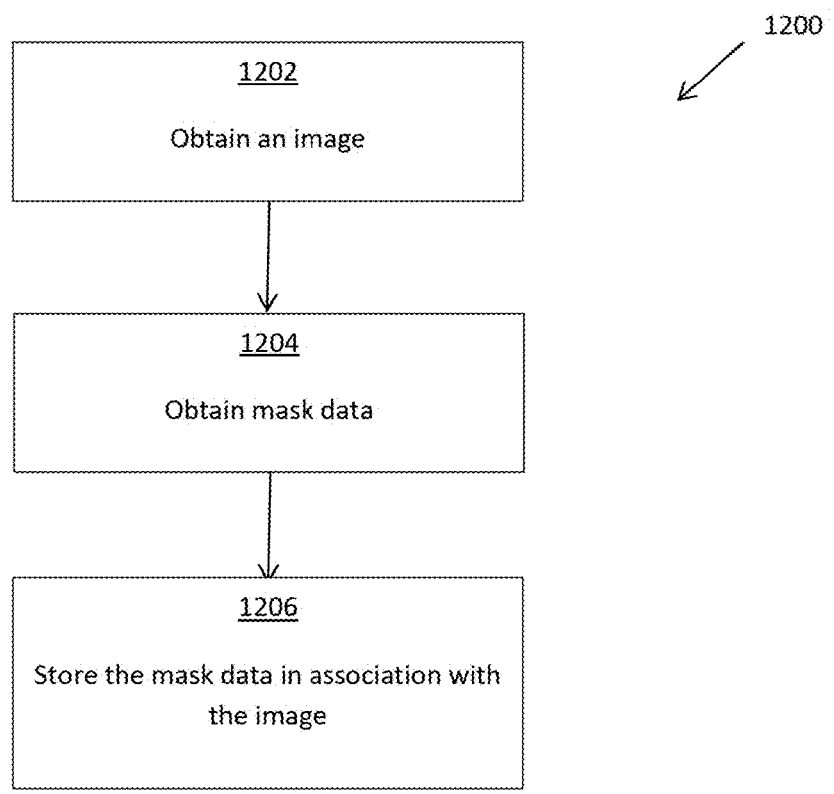
FIG. 12 illustrates a user interface method for setting up a mask in accordance with other embodiments.

FIG. 12 illustrates a user interface method 1200 for setting up a mask for an image in accordance with some embodiments. First, an image is obtained (item 1202). In some embodiments, item 1202 may be performed by the processing unit 30 receiving the image wirelessly or through a wired connection from the sender device 80. In other embodiments, item 1202 may be performed by the processing unit 30 retrieving the image (e.g., the image 300) from a non-transitory medium at the user device 10. In further embodiments, item 1202 may be performed by the processing unit 30 accessing a storage location that stores the image in the user device 10.

Next, mask data is obtained (item 1204). In some embodiments, item 1204 may be performed by the processing unit 30 of the user device 10 receiving mask data. For example, the user of the user device 10 may select one of a plurality of available masks for masking an image. In such cases, the selected mask or an identity of the selected mask may be considered the mask data obtained by the processing unit 30. As another example, the user of the user device 10 may select a transparency of a mask for covering the image. In such cases, the selected transparency (e.g., a transparency alpha value) may be considered mask data that is obtained by the processing unit 30 receiving the input from the user regarding the selected transparency.

Returning to the method 1200, next, the mask data is stored in association with the image (item 1206). In some embodiments, the mask data may be stored as embedded data in the image. In other embodiments, the mask data and the image data may be stored in separate dedicated locations in a non-transitory medium, but are associated with each other using pointer(s), indexing, etc.

In some embodiments, the user device 10 may also present a user interface for allowing a user of the device 10 to prescribe all third-party images (e.g., images with no masking prescription) to be masked by default. This may prevent accidental showing of any images. In other embodiments, the user may use such user interface to select certain types of images (e.g., web images, pdf images, etc.) for masking. As another example, the user may prescribe images from certain website(s) be masked by default. In further example, the user may select certain photo folder for image masking. For example, a smart phone may have multiple folders for storing different pictures. The user may select one or a plurality of such folders for image masking.

In such cases, when a user opens a folder to view pictures therein, the images will be masked by default. In further embodiments, the user interface may allow the user to rate images according to a rating system. For example, an image rated as "0" indicates that the image is to be displayed without any masking. An image rated as "2" indicates that the image is to be masked by default (such that when the user selects the image for viewing, the image will be automatically masked). An image rated as "1" indicates that the image is to be masked in response to user input. In such case, the image is not masked by default. Instead, when the user selects the image for viewing, the image will be displayed in its entirety. However, in such cases, masking feature is available to the user, and the user may select to mask the image (e.g., by tapping a selected area on the image or screen twice).

In further embodiments, the rating of a certain image may be provided by a content provider. For example, when the image is created, the image may be rated. As another example, when a database storing the image is requested to provide such image to the user device 10, the database may also provide rating for the image.

Figure 13:
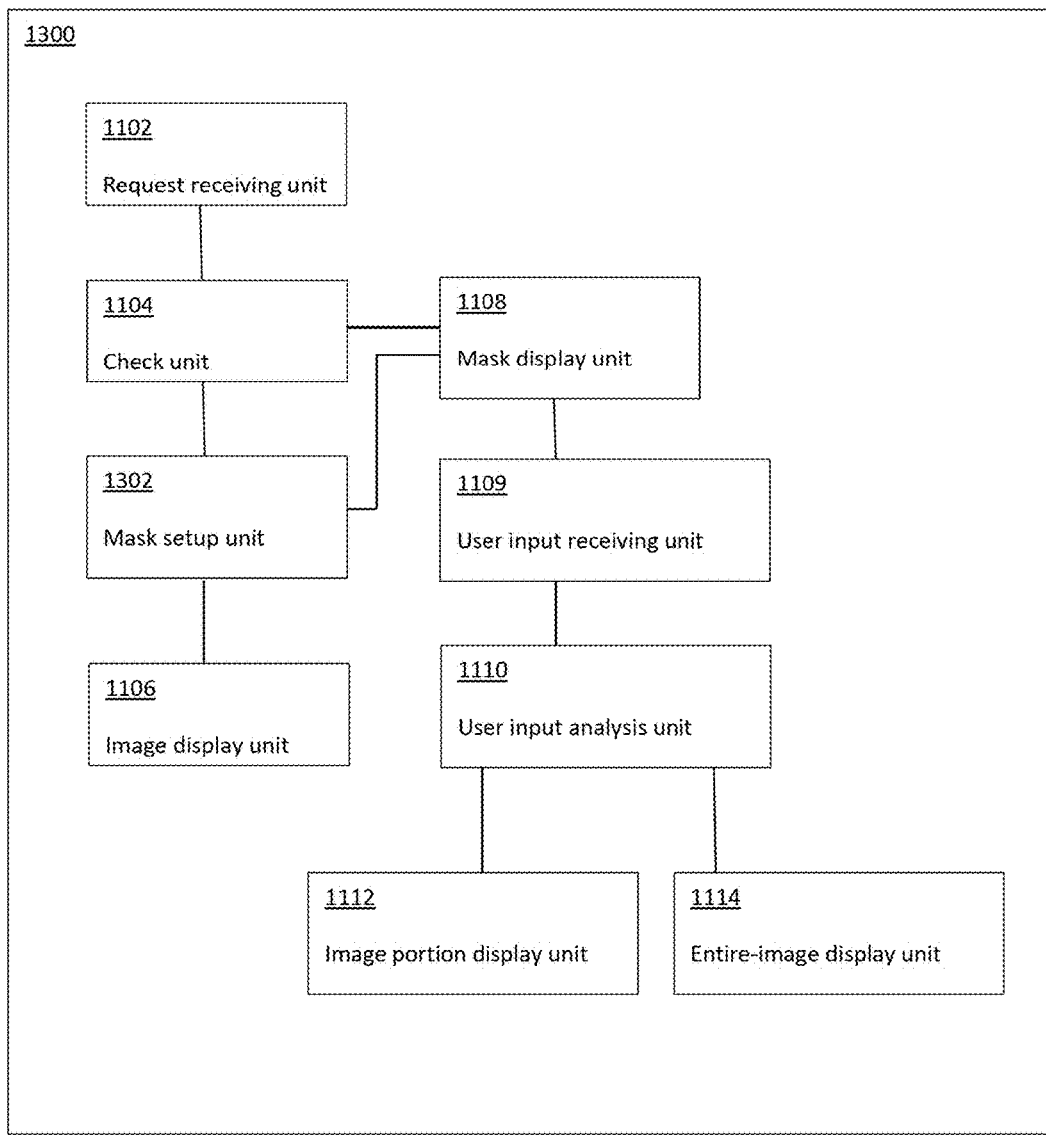
FIG. 13 illustrates a processing unit of a user device having a mask setup unit to perform the method of FIG. 12 in accordance with some embodiments.

FIG. 13 illustrates a processing unit 1300 in accordance with some embodiments. The processing unit 1300 is the same as the processing unit 1100 of FIG. 11, except that the processing unit 1300 further includes a mask setup unit 1302) for allowing the user of the user device 10 to set up a mask 400 for one or more images 300. In the illustrated embodiments, the check unit 1104 is configured to determine whether the image 300 is a third party image (e.g., image that has no prescription flag associated therewith) or not. If the image 300 is a third party image, that means there is no mask that has been set up for the image 300 (and the image has no prescription flag), and accordingly, the mask setup unit 1302 will prompt the user to see if the user wants to setup a mask for the image (wherein the mask setup process may include adding a prescription flag to indicate whether the image is to be masked or not when displayed). On the other hand, if the check unit 1104 determines that the image 300 is not a third party image, the check unit 1104 then determines whether the image 300 has a mask associated therewith (e.g., the image 300 may already have a prescription flag setup to indicate that the image 300 is to be masked or unmasked from a mask when displayed, but there may be no mask setup yet for the image). After the check unit 1104 determines that the image 300 has no mask associated therewith, the mask setup unit 1302 may prompt the user to see if the user wants to setup a mask for the image. If the user chooses not to setup the mask, then the image display unit 1106 will operate the display 20 to display the entire image. On the other hand, if the user chooses to setup the mask, the mask setup unit 1302 then performs the method of FIG. 12 to set up a mask 400 for the image 300, and the mask display unit 1108 will operate the display 20 to display the masked image. In some embodiments, the processing unit 1300 may be the processing unit 30 in the user device 10 of FIG. 1.

In some embodiments, a sync-play feature may be provided for allowing the same image to be viewed simultaneously at two or more devices. In particular, when two user devices are online at the same time, or are communicatively coupled to each other (e.g., through wifi, or another communication link), sync-play mode may be initiated either through a request by one user device and acknowledge by another user device, or it may be initiated by default in certain appropriate situations. During the sync-play mode, the user of the user device receiving the image may control the viewing of the image, the user of the user device sending the image may control the viewing of the image, or both the users of the user devices may jointly control the viewing of the image.

Figure 14A:
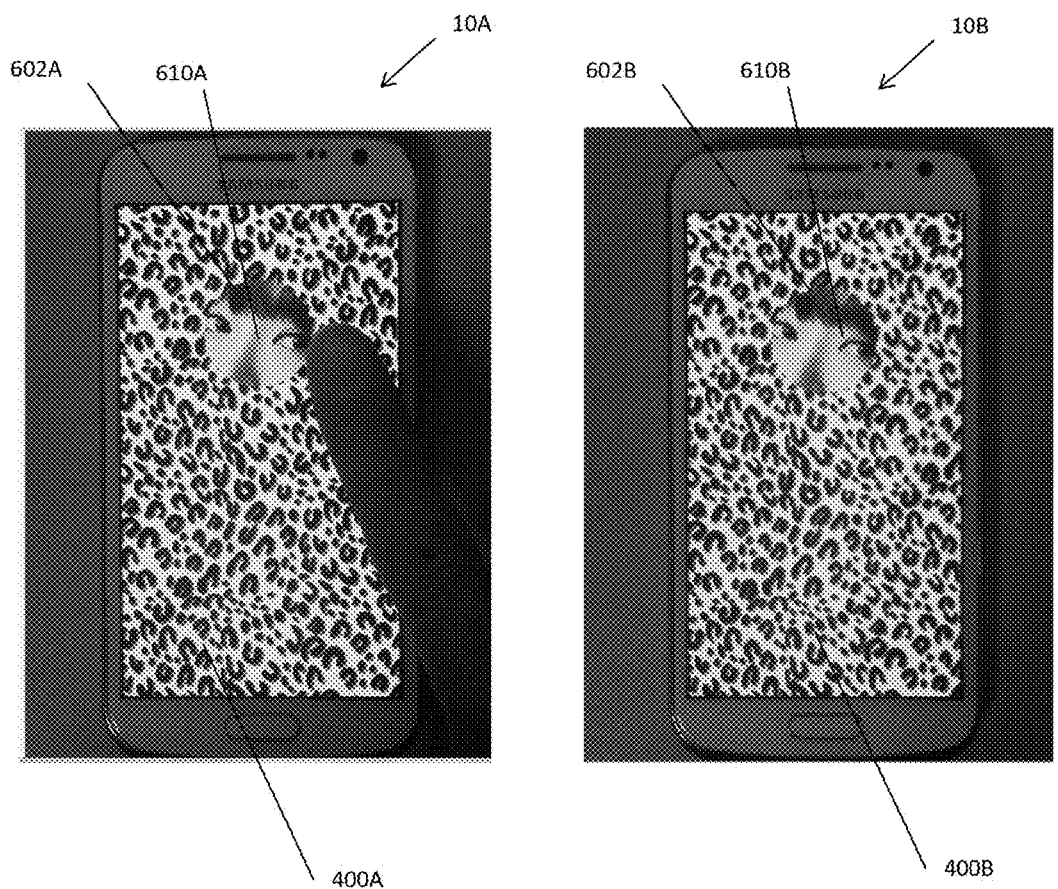
FIG. 14A example of a portion of an image being displayed on two devices while a remaining portion of the image is masked.
Figure 14B:
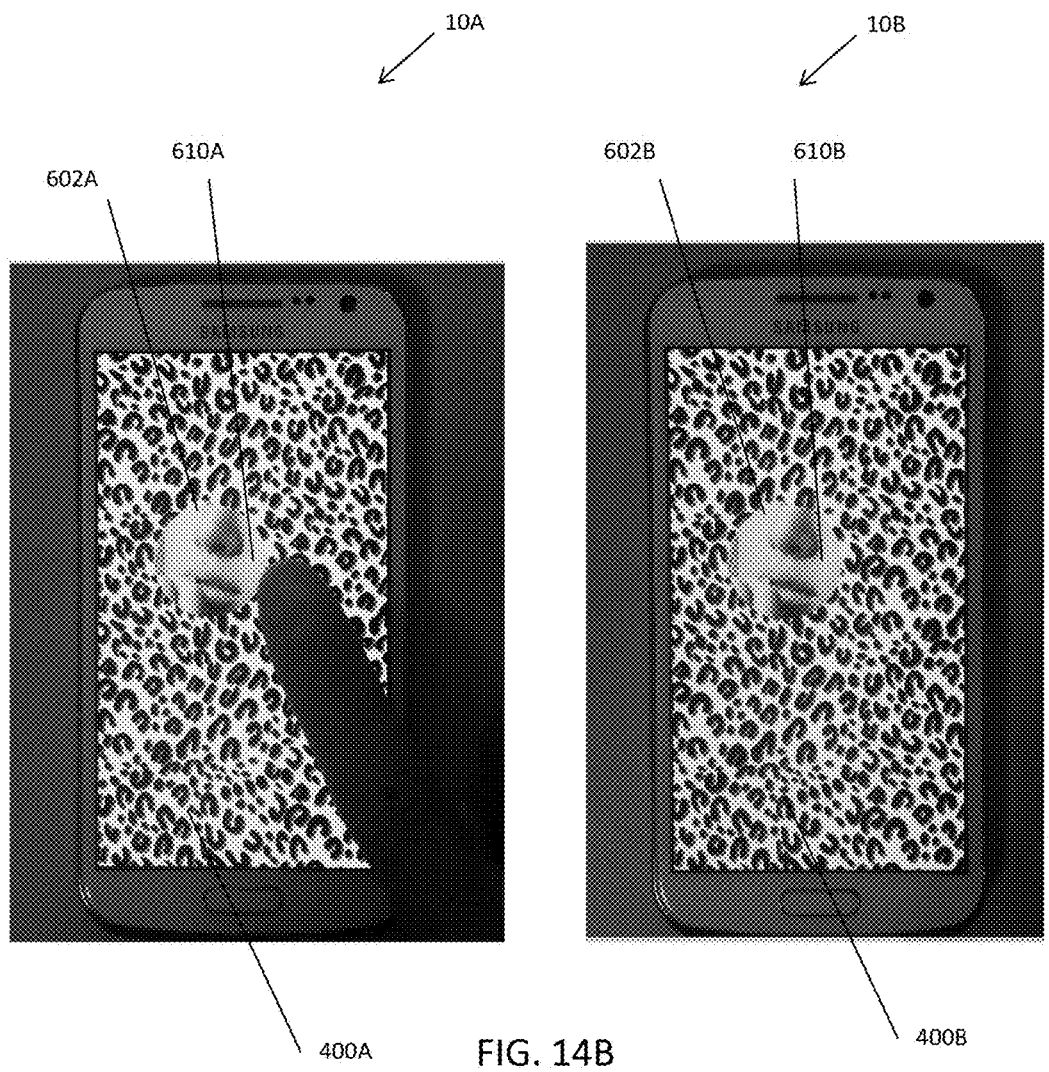
FIG. 14B illustrates another example of a portion of an image being displayed on two devices while a remaining portion of the image is masked.

FIGS. 14A and 14B illustrate an example of the sync-play mode. In the illustrated example, the user device 10A (sender) transmits an image to the user device 10B (receiver). Such may be accomplished through a short distance connection (e.g., wifi), through the Internet, or through any of other known networks (wired and/or wireless network). Thereafter, either the sender or the receiver may initiate sync-play mode. For example, the user device 10A may send a request to the user device 10B for initiating the sync-play mode. If the user device 10B sends back a response, then sync-play mode is initiated. Alternatively, the user device 10B may send a request to the user device 10A for initiating the sync-play mode. If the user device 10A sends back a response, then sync-play mode is initiated.

After both of the user devices 10A, 10B enter in sync-play mode, both of them display the same masked image and can interact with the masked image in sync-mode in real-time. In some cases, the user of the user device 10A viewing a masked image may like to share the viewing experience in real time with another user (e.g., user of user device 10B), and accordingly, the user of the user device 10A may operate the user device 10A to initiate sync-play. In other cases, the user of the receiving user device 10B may want to interact with the image owner after receiving the masked image, and accordingly, the user of the user device 10B may operate the user device 10B to initiate sync-play. When in the sync-play mode, the masked image could be selected by the user who initiated the sync-play, and all users in the same sync-play session may also interact with masked image for real time interaction. For example, when the user of the user device 10A touches a part of the masked image to view a portion 610 of the image in the viewing window 602, a user input signal is generated by the user maneuver, and in response, the user device 10A will display the portion 610 of the image while a remaining portion of the image remains masked. At the same time, the user device 10A may transmit a signal to the user device 10B, causing the user device 10B to display the same portion 610 of the image while a remaining portion of the image remains masked in the display of the user device 10B. In some embodiments, the signal transmitted from the user device 10A to the user device 10B for sync-play may be a copy of the user input signal generated by the maneuver of the user of the user device 10A. In such cases, when the user device 10B receives the user input signal, the user device 10B will process the user input signal as though it is generated by a maneuver of the user of the user device 10B (although the user input signal is actually generated by the user of the user device 10A). In other embodiments, the signal transmitted from the user device 10A to the user device 10B for sync-play may be a screen display duplication signal or instruction, which is configured to copy screen display of the user device 10A for the user device 10B. For example, the display duplication signal may be a copy of the screen image. Also, in some embodiments, the transmitted signal may be generated by the processing unit of the user device 10A, and may include information about the view window (e.g., position, size, shape, etc., or a combination of the foregoing). Such information may be in a form of instruction, which when executed by the processing unit of the receiving user device 10B, will cause the user device 10B to display the same image as that in the user device 10A. Such information may also be considered a form of user input because it is generated in response to input from the user of the user device 10A. Thus, the user of the user device 10B will see what the user of the user device 10A sees in the sync-play mode, with the user device 10A being the master, and the user device 10B being the slave. If the user of the user device 10A moves his finger to different positions on the masked image to reveal different portions of the image on the display of the user device 10A, the user device 10A may transmit a corresponding signal to the user device 10B, causing the user device 10B to display the same thing on its display (see FIGS. 14A, 14B). In addition, when the user of the sending user device 10A touches the lower right corner of the masked image to turn on the display of the full image, the user device 10A will display the entirety of the image, and at the same time, may transmit a corresponding signal to the user device 10B, causing the user device 10B to also display the entirety of the image.

In some embodiments, during the sync-play mode, if the user of the user device 10A is the owner of an image, then he/she may assign the control privilege of the image to the user device 10B. For example, in some embodiments, the user device 10A may send a command to the user device 10B to give the user of the user device 10B control (e.g., so that the user device 10B may display the full image) of the image. The control given to the user device 10B may be a partial control (e.g., with partial viewing privilege, in which case, the user device 10B may only perform partial display of the image in response to interaction by the user of the user device 10B), or a full control (e.g., with full viewing privilege, in which case, the user of the user device 10B may perform both partial display and full display of the image). After the user device 10B has viewing control during the sync-play mode, when the user of the user device 10B is viewing a particular portion of the image, the same portion of the image is also displayed on the user device 10A (and any other user devices in the same sync-play session if they are available and are in communication with the user device 10A). Similarly, if the user device 10B has full viewing control, when the user of the user device 10B is viewing the full image, the same full image is also displayed on the user device 10A. Thus, in such cases, the user device 10B becomes the master and the user device 10A becomes the slave. Also, in some embodiments, the viewing privilege given by the sender of the image of the user device 10A to the user device 10B may be for the duration of the sync-play session, in which case, after the sync-play session is over, the user device 10B will have the same privilege as that before the sync-play session. For example, if the user device 10B previously has only the privilege to view partial image, then after the sync-play session is over, the user device 10B can only view partial image, and not the full image. Thus, the user of the sending user device 10A may retain the right to control the full display of this the particular image. As another example, if the user device 10B previously has no privilege to view partial or full image, then after the sync-play session is over, the user device 10B will not be able to display partial or full image. In other embodiments, the granting of the viewing privilege by the sender of the image of the user device 10A to the user device 10B during the sync-play mode may be permanent.

In alternative embodiments, when the sender of the image of the user device 10A operates the user device 10A to give control to the user device 10B during the sync-play mode, the user device 10A does not specify the viewing privilege for the user device 10B. Instead, the user device 10A relies on a viewing privilege that has previously been given to the user device 10B for that image. In such cases, after control is given to the user device 10B, the user device 10B can control the viewing of the image based on a viewing privilege of the image that has been granted by the user device 10A to the user device 10B. For example, in some embodiments, when the user device 10A sends the image for reception by the user device 10B, the processing unit in the user device 10A may also transmit metadata regarding the image. In one implementation, the metadata may include information regarding privilege of the image by the receiving user device 10B. In the illustrated example, the user of the user device 10A wants the user of the user device 10B to see partial image, but not the entire image. Accordingly, when the user device 10A transmits the image, such prescribed privilege information is also transmitted by the user device 10A to the user device 10B. Therefore, when the user device 10B later enters the sync-play mode with the user device 10A and has control of the image, no full image will be displayed even if the user of the user device 10B touches the lower right corner of the masked image. In some cases, the dedicated area (e.g., a corner) for turning on and off the full display may be marked. In such cases, if the user device 10B does not have the privilege to perform full viewing of the image, the dedicated area may be greyed out or cleared so that the user of the user device 10B will not be able to see the full image on his/her own interactions. Also, in the above example, even when the user device 10B is not in sync-play mode, no full image will be displayed if the user of the user device 10B touches the lower right corner of the masked image (because the user device 10B has the privilege to only perform partial viewing of the image).

Thus, as shown in the above embodiments, a user input to control the display of the image may be entered at a local device (e.g., the user of the user device 10B may touch the screen to interact with the masked image), or the user input may be from a wireless or wired network connected remote device and transmitted to the local device such that the display on the local device is controlled by the remote device to be the same as on the remote device (e.g., the user input in the above example may be from the user device 10A that is in communication with the user device 10B through a wired or wireless network in the sync-play mode). In some embodiments, in the sync-play mode, the signal transmitted from the user device 10A to the user device 10B may be a copy of the user input signal generated by the maneuver of the user of the user device 10A. In such cases, when the user device 10B receives the user input signal, the user device 10B will process the user input signal as though it is generated by a maneuver of the user of the user device 10B (although the user input signal is actually generated by the user of the user device 10A).

In other embodiments, the same effect may alternatively be achieved through direct screen display duplication. For example, in other embodiments, the signal transmitted from the user device 10A to the user device 10B for sync-play may be a screen display duplication signal (e.g., a copy of the image as displayed in the master user device 10A) or instruction, which is configured to copy screen display of the user device 10A for the user device 10B. Such signal from the user device 10A may be considered another example of user input because it is generated in response to input entered by user of the user device 10A. In some embodiments, the signal from the user device 10A may be instructions, which when executed at the user device 10B, will cause the user device 10B to display the same image as that at the user device 10A. Thus, while instructions are generated at the master device (the user device 10A in the example) for reception at the slave device (the user device 10B in the example) through wired or wireless connection, after the instructions are received by the user device 10B, the user device 10B will execute those instructions as though they are local instructions at the user device 10B to generate and show the same image display. Accordingly, image display (partial or full) may be performed through local instructions, or through wireless or wired network connected remote instructions (such as in the sync-play mode).

In one implementation, when the processing unit of the receiving user device 10B receives a user input to display the entire image during a sync-play mode, the processing unit in the user device 10B checks to see if a previous command (before the sync-play session) for granting full control of the image has been received from the sending user device 10A. If so, the processing unit of the user device 10B then controls the display of the user device 10B to display the entire image. If the processing unit of the user device 10B determines that a previous command for granting full control has not been received before the sync-play session, the processing unit then determines whether a command for granting full control of the image has been granted during the sync-play mode. If so, then the processing unit of the user device 10B then controls the display of the user device 10B to display the entire image. If not, the processing unit of the user device 10B then prevents the display of the full image on the screen of the user device 10B.

Similarly, when the processing unit of the receiving user device 10B receives a user input to display a partial image during a sync-play mode, the processing unit in the user device 10B checks to see if a previous command (before the sync-play session) for granting partial control of the image has been received from the sending user device 10A. If so, the processing unit of the user device 10B then controls the display of the user device 10B to display the partial image. If the processing unit of the user device 10B determines that a previous command for granting partial control has not been received before the sync-play session, the processing unit then determines whether a command for granting partial control of the image has been granted during the sync-play mode. If so, then the processing unit of the user device 10B then controls the display of the user device 10B to display the partial image. If not, the processing unit of the user device 10B then prevents the display of the partial image on the screen of the user device 10B.

In some embodiments, the ability to interact with a masked image to either see partial or full image may be considered a right. In other embodiments, the ability to interact with a masked image to either see partial or full image may alternatively not be considered a right. Instead, it can be considered to be a privilege prescribed by the image owner/sender. The image sender of the sending user device 10A is the owner of the image. In some embodiments, only the owner has the right or power to decide how the viewer of the image at the receiving user device 10B can interact with the image. For example, the owner may enter user input at the user device 10A prescribing how much the viewer of the receiving user device 10B can see the image, full or partial or both; and if partial, of which reference positions and with how much details. The user device 10A processes such user input for transmission to the user device 10B to provide certain privilege for the user of the receiving user device 10B. Thus, the ability to interact with the masked image becomes a privilege given to the viewer/user by the owner/sender. The sender may use the user device 10A to set a prescribed privilege when the image 300 is sent, before or during a sync-play session. For the same image 300, the sender may also use the user device 10A to assign different or no privilege to different viewers/users. Also, the sender may user the user device 10A to change the privilege for any given image or viewer during a sync-play mode. The owner of a certain image may be assumed by default to always have full privilege to view the image.

In some embodiments, a certain image may have certain ownership information associated with it. Such ownership information may be embedded with the image, or may be stored in association with the image. A user device (e.g., user device 10A, or user device 10B) may process such ownership information to determine privilege and what action may or may not be performed by the user of the user device. Following the above example, when the user device 10A processes the image 300 (which is owned by the user of the user device 10A), the user device 10A will know that the ownership belongs to the user of the user device 10A based on such ownership information. Accordingly, the user device 10A may then allow the user of the user device 10A to set privilege for other receiving user device(s), and may allow the user of the user device 10A to have full control of the image based on the ownership information. When the image 300 is transmitted to the receiving user device 10B, the user device 10B will know that the ownership belongs to the user of the user device 10A, and not the user of the user device 10B, based on such ownership information. Accordingly, the user device 10B may prevent the user of the user device 10B from having full control (unless such is granted by the user of the user device 10A), and/or may prevent the user of the user device 10B from setting viewing privilege for other user device(s).

In some embodiments, the sync-play mode may be one-to-one between a sending user device and a receiving user device. In other embodiments, the sync-play mode may be one-to-many between one sending user device and a plurality of receiving user devices (for the respective viewers).

In some embodiments, users of user devices in sync-play mode may take turns to control the interactivity with the masked image. In one implementation, sync-play session time may be divided into small time slots. Any user that first makes a privileged move with his/her user device may take control of the interaction with the masked image within that time slot. In other implementation, the order to interact with the masked image may be based on pre-assigned seniority of the users. Also, in some embodiments, the ability to control the viewing interactivity may be granted by another user or other users. For example, if there are three users in a sync-play mode, and user No. 2 is controlling the interactivity of the masked image, then user No. 2 may selectively pass the control to one of the other two users (e.g., User No. 3).

In the above embodiments, the user of the user device 10A assigns viewing privilege of an image while retaining the right to enable what the viewer(s) of other user device(s) can see or interact in sync-play mode. As illustrated in the above examples, the viewing privilege assigned during the sync-play mode may be different from, or the same as, the viewing privilege that the receiving user device has before the sync-play mode. Also, the privilege assigned to the receiving user device, and the control retained by the sender, do not need to be mutually exclusive. For example, both the receiving user device and the sending user device may fully enable the viewer to see a portion or an entirety of an image.

In the above embodiments, the mask 400 is configured to cover an entirety of the image 300. In other embodiments, the mask 400 may be configured to cover one or more portions of the image 300, but not the entirety of the image. For example, there may be a first mask portion in the mask 400 covering a first area in the image 300, and a second mask portion in the mask 400 covering a second area in the image 300. Thus, an area of a mask 400 may be less than an area of the image 300. In other embodiments, an area of the mask 400 may be more than an area of the image 300.

Also, in other embodiments, instead of the example of the above user-interaction maneuver, other user maneuvers may be used to selectively view different portions of the image 300. For example in other embodiments, a slider control may be presented at a side of a masked image. In such cases, the user may place a finger on the slider control to move the slider. In response the processing unit 30 controls the screen 20 to display a narrow band of the image 300. For example, if the slider control is at a bottom of the masked image, then the displayed portion of the image 300 will have a form of a vertical strip of the image 300. If the slider control is at a left or right side of the masked image, then the displayed portion of the image 300 will have a form of a horizontal strip of the image 300.

In addition, in other embodiments, instead of using a touch screen to control displaying a portion of the image 300 or an entirety of the image, the device 10 may provide other types of user control for such purposes. For example, in other embodiments, the device 10 may include a touch pad, a trackball, a joystick, a mouse, a keyboard, a remote control, a remote pointer control, etc., for allowing the user to select a portion of the image 300 or an entirety of the image 300 for viewing.

As discussed in one or more examples above, in some embodiments, user input may be received by a user device (e.g., user device 10A, user device 10B, etc.), which when processed by the processing unit in the user device, will cause a portion or an entirety of an image to be displayed. In some embodiments, the user input may be generated in response to user maneuver performed at the user device, or at another device that is remote from the user device but is communicatively coupled (e.g., by wire or wirelessly) to the user device. Also, in some embodiments, the user input may be a sequence of processing unit instructions stored on the user device. Such user input may be created based on input entered by the user at the user device. Alternatively, such user input may be received from another device in communication with the user device through wired or wireless network. Such user input may also be transmitted to another device. In the embodiments in which the user input includes program instructions, such program instructions may include information regarding full or partial display, viewing window size(s) for one or more reference position(s), viewing window shape(s) for one or more reference position(s), or any combination of the foregoing. Also, in some embodiments, a user input may be a program configured to be executed by a processing unit of a user device to perform one or more functions. For example, the program may be executed by the processing unit to automatically show previously discussed hot spots in certain desired order or manner. As another example, the program may be executed by the processing unit to scan through an entire masked image with a desired scan pattern and speed, and display portions of the image with selected reference position step size, viewing window size and shape, and mask content data or transparency values. Furthermore, in some embodiments, the user device may provide a user interface for allowing a user to input a user input program or to select a user input program from a plurality of available programs (wherein the selected program may be considered a user input). In some embodiments, there may be different programs for implementing different display patterns and effects for a masked image. Furthermore, in some embodiments, a certain dedicated spot on a masked image may be assigned to execute certain program (e.g., user input instructions). The dedicated spot may be assigned by a user, and the program for execution using the dedicated spot may be input or selected by the user. In some embodiments, the ability to operate on the dedicated spot of the masked image to execute certain program may be considered as a right, or an assigned privilege, as similarly discussed previously. Thus, the user of the user device may operate on the dedicated spot for executing the program, and/or may assign such control ability to other user(s) of other device(s) in the sync-play mode. In addition, in some embodiments, different programs with different respective display effects may be made available to be downloaded to a user device for free or for a fee.

In other embodiments, instead of displaying the entire image or executing certain program in response to the user through touching a dedicated spot, the displaying of the entire image or the execution of the certain program may be performed in response to a detection (by the processing unit of the user device 10) of a pre-defined maneuver pattern of the user fingertip(s) movement on the touch screen. For example, the user may move his/her fingertip back and forth with certain speed, drawing a circle very quickly, or draw two straight lines with two fingers, etc., on the touch screen to activate the program for showing the entire image or to activate any of other programs. In some embodiments, the pre-defined maneuver pattern may be already defined when the program is installed onto the user device 10. In other embodiments, the user of the user device 10 may define the maneuver pattern for executing certain program(s). For example, the user device 10 may provide a user interface for allowing a user to define the maneuver pattern. The user device 10 then stores the defined maneuver pattern in a non-transitory medium in the user device 10, so that the defined maneuver pattern may later be used by the processing unit of the user device 10 for comparison with a real-time user input.

In the above embodiments, the partial display and the full display of the image 300 are mutually exclusive. In other embodiments, the partial display and the full display of the image 300 do not have to be mutually exclusive. For example, when full display of the image 300 is turned off (e.g., by tapping a dedicated area on the screen or the image 300 twice), partial display functions as an image spying glass at the fingertip as the fingertip moves around on the masked image. When full display is turned on (e.g., by tapping a dedicated area on the screen or the masked image twice), the image 300 is displayed in its entirety, and if a user places a finger at a part of the image 300, then the viewing window 602 may be presented to display a magnified portion of the image 300 within the viewing window 602. In some embodiments, instead of, or in addition to, the magnified portion, the viewing window 602 may also include extra local details.

Also, as discussed, both the image and the mask may be media content of any known type, such as picture, video, document, webpage content, and web links. Thus, when image portion 610 is displayed in the viewing window 602, or when the image 300 is displayed in its entirety, the processing unit 30 may optionally allow the user to interact with the image according to the image type. For example, if the image 300 is a webpage, then the user may interact with the portion of the image 300 being displayed in the viewing window 602, or the image 300 when the image 300 is displayed in its entirety, such as for downloading content, saving page content, clicking on links, typing and providing information, and/or making e-commerce transaction on the page. Also, in some embodiments, the partial displaying in the viewing window 602 may include location-based information prepared dynamically by the processing unit 30. For example, if the image 300 is a map of the United States, then relevant information about each state may be bundled into the image such that as the fingertip moves around different states, corresponding details will be displayed on the display 20.

In some embodiments, the role of image 300 and mask 400 may be reversed. For example, the image 300 may be a picture or web page information about a product. The mask 400 may in concept be shadowed below, or behind, the image 300, rather than conceptually being displayed on top of the image. Thus, the mask 400 may not completely change the look of the image 300, and the masked image in this example may still allow a user to see the image 300 (e.g., the masked image may or may not be as clearly or the same as the image 300 itself, depending how the actual masking is done). Also, in this example, the mask 400 may have detailed information about the image or the content in the image. For example, the mask 400 may have location information about the image or the product in the image, detailed e-commerce order processing information, one or more links (e.g., a link to further software application for e-commerce transaction), and any combination of the foregoing. In some cases, when the user of the user device 10A taps quickly at an arbitrary location in the masked image, the processing unit 30 then operates the display 20 to display a viewing window 602 to display content with the highest set priority. Following the above example, the display 20 may display a viewing window 602 at a location of the mask 400 that has a link for an e-commerce transaction processing form or a webpage for a sponsored product described by the image.

In some embodiments, the masking feature described herein may be provided in a form of application software. In some cases, such may provide more in-depth user interactions and applications. Thus, in some embodiments, one or more features associated with the masking feature may be implemented using programming language (e.g., HTML language, java script, a mark-up language, a script language, or other programming language). For examples, the software implementing the masking feature may be loaded onto a processor, a server, or other types of memory. In some cases, the software may be implemented as a web application, a component or a plug-in of a browser, a component or a plug-in of an operating system, or a proprietary software application. In one implementation, the software for the masking feature may be purchased from an on-line store (e.g., iTune) for download to a handheld device. In alternative embodiments, the masking feature may be implemented using hardware or combination of hardware and software.

As discussed, in some embodiments, the software for the masking feature may be purchased from an on-line store (e.g., iTune) for download to the user device 10. In other embodiments, the masking feature may be provided as a free application for download by the user of the device 10. In such cases, the user may view images with mask(s), but certain features may not be available, and may only be available upon purchase. For example, the double-tap feature to turn on or off the full image may be purchased by the user after the free application has been downloaded. In other embodiments, if a transparency of a mask may be controlled, such control may be purchased by the user. In further embodiments, the magnifying feature for magnifying content within the display window 602 may be purchased by the user. In addition, in other embodiments, the mask setup feature that allows a user to configure a mask may be available upon purchase. Furthermore, in other embodiments, one or more masks may be purchased by the user. In some cases, an advertisement may be displayed together with an image on the screen 20 of the user device 10, in which a sponsor or a third party may pay for the mask.

Also, in some embodiments, an image be displayed locally or be viewed through a webpage with local user interactions. For example, a webpage itself may implement the mask feature so that when a user access the webpage through the user device 10, the user may have one or more images in the webpage masked, and may view portion(s) of the image(s) through the viewing window(s) 602 in the masked image(s). When using the mask feature in the webpage, full control of the mask may be provided for the user. Alternatively, when using the mask feature in the webpage, partial control may be provided for the user (e.g., the user may only move the viewing window 602 and turn the full image on or off). In some cases, if the user downloads an image from the webpage, or transmits the image to another user device, then full control may be provided (e.g., the user may move the viewing window 602 and turn the full image on or off, as well as configure the mask, etc.).

Also, in some embodiments, the mask image 400 may be configured to work with different image viewers. In some cases, the masking of an image 300 may include content muxing, encoding, and/or encryption to protect the masked image to ensure that it will never be opened or displayed by other existing multimedia or document viewer, unless authorized by the user. In some embodiments, masking is done in such a way according to the image owner's choice such that the masked image may be opened or displayed with other different image viewer applications.

It should be noted that the term "image", as used in this specification, may refer to content that may or may not be displayed in a screen. For example, the term "image" may refer to content data stored in a non-transitory medium in un-displayed form (e.g., the partial/entire image 300, the partial/entire mask 400, and/or the partial/entire masked image, may be stored in a non-transitory medium in un-displayed form).

Hardware Architecture

Figure 15:
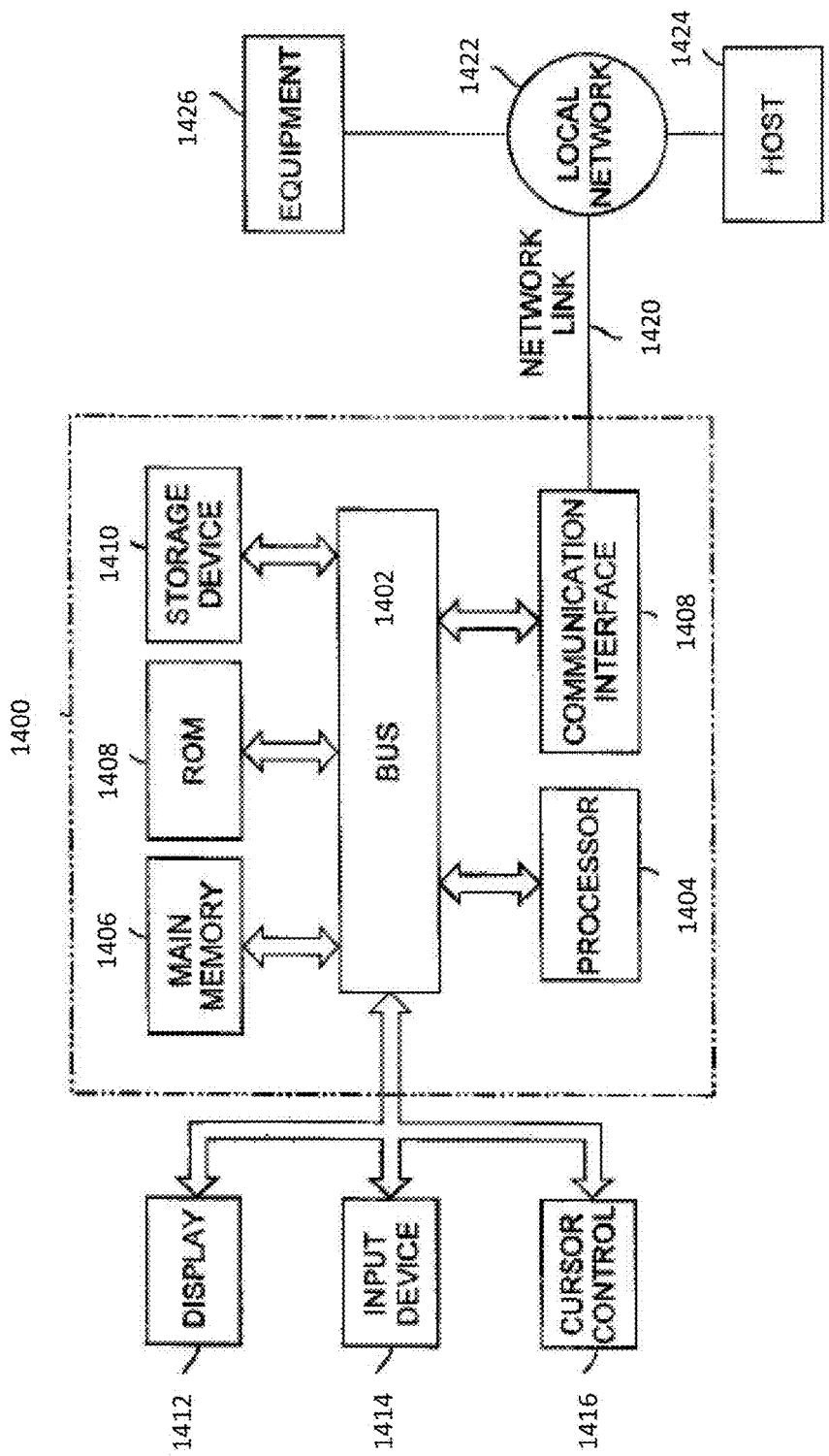
FIG. 15 is a diagram of a hardware system with which embodiments described herein may be implemented.

FIG. 15 is a block diagram that illustrates an embodiment of a hardware system 1400 upon which embodiments described herein may be implemented. In some embodiments, the hardware system 1400 may be a part of a smart phone (e.g., an iPhone®). Also, in some embodiments, the hardware system 1400 may be used to implement one or more components of the user device 10. Hardware system 1400 includes a bus 1402 or other communication mechanism for communicating information, and a processor 1404 coupled with bus 1402 for processing information. Hardware system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Hardware system 1400 may further include a read only memory (ROM) 1408 or other static storage device coupled to bus 1402 for storing static information and instructions for processor 1404. A data storage device 1410, such as a magnetic disk or optical disk, is provided and coupled to bus 1402 for storing information and instructions.

Hardware system 1400 may be coupled via bus 1402 to a display 1412 for displaying information to a user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. In some embodiments, the hardware system 1400 may be a part of a device that has a touchscreen. In such cases, items 1412, 1414, and 1416 may be integrated together.

Embodiments described herein are related to the use of hardware system 1400 to provide an interface for allowing a user to view images in a masked configuration or non-masked configuration. According to some embodiments, such use may be provided by hardware system 1400 in response to processor 1404 executing one or more sequences of one or more instructions contained in the main memory 1406. Such instructions may be read into main memory 1406 from another processor-readable medium, such as storage device 1410. Execution of the sequences of instructions contained in main memory 1406 causes processor 1404 to perform the process steps described herein. One or more processors in a multi-processing arrangement may also be employed to execute the sequences of instructions contained in main memory 1406.

The term "processor-readable medium" as used herein refers to any medium that participates in providing instructions to processor 1404 for execution. Such a medium may take many forms, including but not limited to, non-volatile media, volatile media, and transmission media. Non-volatile media includes, for example, optical or magnetic disks, such as storage device 1410. Volatile media includes dynamic memory, such as main memory 1406. Transmission media includes coaxial cables, copper wire and fiber optics, including the wires that comprise bus 1402. Transmission media can also take the form of acoustic or light waves, such as those generated during radio wave and infrared data communications.

Common forms of processor-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a processor can read.

Various forms of processor-readable media may be involved in carrying one or more sequences of one or more instructions to processor 1404 for execution. For example, the instructions may initially be carried on a magnetic disk of a remote computer. The remote computer can load the instructions into its dynamic memory and send the instructions over a telephone line using a modem. A modem local to hardware system 1400 can receive the data on the telephone line and use an infrared transmitter to convert the data to an infrared signal. An infrared detector coupled to bus 1402 can receive the data carried in the infrared signal and place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Hardware system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry data streams representing various types of information.

Network link 1420 typically provides data communication through one or more networks to other devices. For example, network link 1420 may provide a connection through local network 1422 to a host computer 1424. Network link 1420 may also transmits data between an equipment 1426 (e.g., a network device) and communication interface 1418. The data streams transported over the network link 1420 can comprise electrical, electromagnetic or optical signals. The signals through the various networks and the signals on network link 1420 and through communication interface 1418, which carry data to and from hardware system 1400, are exemplary forms of carrier waves transporting the information. Hardware system 1400 can send messages and receive data, including program code, through the network(s), network link 1420, and communication interface 1418. Although one network link 1420 is shown, in alternative embodiments, communication interface 1418 can provide coupling to a plurality of network links, each of which connected to one or more local networks. In some embodiments, hardware system 1400 may receive data from one network, and transmit the data to another network. Hardware system 1400 may process and/or modify the data before transmitting it to another network.

In other embodiments, instead of a part of a phone (e.g., smart phone), the hardware system 1400 may be implemented in other devices, such as hand held devices (phones, personal organizers, cameras, pagers, camcorders, blackberries, digital books, or other electronic devices that have a display), computers, tablets, iPads®, mini iPads®, televisions, computer screens, etc.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed:

1. A user interface method, comprising:
obtaining an image;
obtaining a mask from a non-transitory medium that stores the mask;
displaying the mask on a screen of a device based on a selection of the image;
receiving a user input at the device, the user input indicating that a portion of the image is desired to be viewed by a user;
in response to the user input, displaying on the screen of the device the portion of the image while preventing public viewing of a remaining portion of the image by covering the remaining portion of the image using at least a part of the mask, wherein the portion of the image is displayed in a viewing window; and
translating an entirety of the viewing window relative to the mask in response to a movement of a finger of the user while the finger is placed against the screen;
wherein a relative position of the viewing window with respect to a finger-contact location on the screen remains the same during at least a part of the movement of the finger while the finger is placed against the screen; and
wherein the relative position of the viewing window with respect to the finger-contact location is adjustable, and wherein an entirety of the viewing window is offset from the finger-contact location to prevent the finger from blocking the image being displayed in the viewing window.

2. The method of claim 1, wherein:
the screen of the device is a touchscreen; and
the user input is resulted from the user touching a portion of the screen to prescribe a reference position and the viewing window for viewing the portion of the image, wherein the viewing window has a size that is smaller than a size of the image, and the viewing window is at a pre-determined position relative to the reference position prescribed by the user touching the portion of the screen.

3. The method of claim 1, further comprising receiving an additional input from the user at the device resulted from the user swiping his/her finger across at least a part of the screen along a trajectory; and moving the viewing window in the trajectory that corresponds with the additional input to display different portions of the image.

4. The method of claim 1, further comprising:
receiving an additional user input at the device, the additional user input indicating that an entirety of the image is desired to be viewed by the user of the device; and
in response to the additional user input, displaying on the screen of the device the entirety of the image.

5. The method of claim 4, wherein the additional user input is resulted from the user touching a dedicated area of a masked image.

6. The method of claim 4, wherein the additional user input is resulted from the user making a pre-defined maneuver pattern with one or more fingers.

7. The method of claim 1, further comprising:
receiving an additional user input at the device, wherein the additional user input is resulted from the user touching a dedicated area of a masked image or making a pre-defined maneuver pattern with one or more fingers; and
in response to the additional user input, executing a program that comprises user input instructions.

8. The method of claim 1, wherein the obtaining the mask is performed by the device receiving the mask wirelessly or through a wired connection.

9. The method of claim 1, wherein the non-transitory medium is in the device, and wherein the obtaining the mask is performed by the device retrieving the mask from the non-transitory medium in the device.

10. The method of claim 1, further comprising providing a plurality of masks for selection by the user, and wherein the obtaining the mask comprises receiving an input from the user for selecting one mask of the plurality of masks.

11. The method of claim 1, wherein a transparency of the mask, and/or a size of the viewing window is adjustable.

12. The method of claim 1, further comprising transmitting a signal to an other device during a sync-play mode to cause an image portion that is identical to the portion of the image to be displayed on a screen of the other device.

13. The method of claim 12, wherein the signal comprises the user input.

14. The method of claim 12, wherein the signal comprises a screen display duplication signal.

15. The method of claim 12, wherein the signal comprises instructions, which when executed by the other device, will cause the other device to create the image portion, or to copy the portion of the image as the image portion, for display at the other device.

16. The method of claim 1, wherein the device comprises a cell phone, a smart phone, an iPhone®, a personal-digital-assistant (PDA), a BlackBerry®, an iPad®, a Mini-iPad®, a tablet, a computer screen, a television screen, or a digital camera.

17. The method of claim 1, wherein the user is a user of the device, and the user input is from the user of the device.

18. The method of claim 17, further comprising transmitting the user input to an other device that is in communication with the device through a wired or wireless network.

19. The method of claim 1, wherein the user is a user of an other device, and the user input is from the other device that is in communication with the device through a wired or wireless network.

20. The method of claim 1, wherein the image comprises a message or a media content, and the mask is selectively configurable for private viewing of the message or the media content.

21. The method of claim 1, wherein the mask has a default state in which the mask masks an entirety of the image, and wherein the user input is for changing the default state of the mask to a viewing state in which the mask allows the user to view the portion of the image.

22. The user interface method of claim 1, wherein an entirety of a perimeter of the viewing window is moveable relative to the mask in a same direction as a single unit.

23. A device comprising:
a non-transitory medium storing an image and a mask;
a processing unit to receive a user input, the user input indicating that a portion of the image is desired to be viewed by a user; and
a screen operable by the processing unit to display the portion of the image in a viewing window in response to the user input while preventing public viewing of a remaining portion of the image by covering the remaining portion of the image using at least a part of the mask;
wherein the processing unit is configured to translate an entirety of the viewing window relative to the mask in response to a movement of a finger of the user while the finger is placed against the screen;
wherein a relative position of the viewing window with respect to a finger-contact location on the screen remains the same during at least a part of the movement of the finger while the finger is placed against the screen; and
wherein the relative position of the viewing window with respect to the finger-contact location is adjustable, and wherein an entirety of the viewing window is offset from the finger-contact location to prevent the finger from blocking the image being displayed in the viewing window.

24. The device of claim 23, wherein:
the screen of the device is a touchscreen; and
the user input is resulted from the user touching a portion of the screen to prescribe a reference position and the viewing window for viewing the portion of the image, wherein the viewing window has a size that is smaller than a size of the image, and the viewing window is at a pre-determined position relative to the reference position prescribed by the user touching the portion of the screen.

25. The device of claim 23, wherein the processing unit is configured to receive an additional input from the user resulted from the user swiping his/her finger across at least a part of the screen along a trajectory; and
wherein the processing unit is configured to operate the screen to move the viewing window in the trajectory that corresponds with the additional input to display different portions of the image.

26. The device of claim 23, wherein the processing unit is configured to receive an additional user input, the additional user input indicating that an entirety of the image is desired to be viewed by the user of the device; and
wherein the processing unit is configured to operate the screen to display the entirety of the image in response to the additional user input.

27. The device of claim 26, wherein the additional user input is resulted from the user touching a dedicated area of a masked image.

28. The device of claim 26, wherein the additional user input is resulted from the user making a pre-defined maneuver pattern with one or more fingers.

29. The device of claim 23, wherein the processing unit is configured to receive an additional user input resulted from the user touching a dedicated area of a masked image or making a pre-defined maneuver pattern with one or more fingers; and
wherein the processing unit is configured to execute a program that comprises user input instructions in response to the additional user input.

30. The device of claim 23, further comprising a wireless receiver for receiving the mask wirelessly or a connector for receiving the mask through a wired connection.

31. The device of claim 23, wherein the non-transitory medium stores a plurality of masks for selection by the user, and wherein the mask is selected from the plurality of masks.

32. The device of claim 23, wherein a transparency of the mask and/or a size of the viewing window is adjustable.

33. The device of claim 23, wherein the processing unit is configured to generate a signal for transmission to an other device during a sync-play mode to cause an image portion that is identical to the portion of the image to be displayed at the other device during the sync-play mode.

34. The device of claim 33, wherein the signal comprises the user input.

35. The device of claim 33, wherein the signal comprises a screen display duplication signal.

36. The device of claim 33, wherein the signal comprises instructions, which when executed by the other device, will cause the other device to create the image portion, or to copy the portion of the image as the image portion, for display at the other device.

37. The device of claim 23, wherein the device comprises a cell phone, a smart phone, an iPhone®, a personal-digital-assistant (PDA), a BlackBerry®, an iPad®, a Mini-iPad®, a tablet, a computer screen, a television screen, or a digital camera.

38. The device of claim 23, wherein the user is a user of the device, and the processing unit is configured to receive the user input from the user of the device.

39. The device of claim 38, further comprising transmitting the user input to an other device that is in communication with the device through a wired or wireless network.

40. The device of claim 23, wherein the user is a user of an other device that is in communication with the device through a wired or wireless network, and the processing unit is configured to receive the user input from the other device through the wired or wireless network.

41. The device of claim 23, wherein the image comprises a message or a media content, and the mask is selectively configurable for private viewing of the message or the media content.

42. A program product that includes a non-transitory medium usable by a processing unit, the non-transitory medium having a set of stored instructions, an execution of which by the processing unit causes a process to be performed, the process comprising:
  obtaining an image;
  obtaining a mask from a memory unit that stores the mask;
  displaying the mask on a screen of a device based on a selection of the image;
  receiving a user input at the device, the user input indicating that a portion of the image is desired to be viewed by a user;
  in response to the user input, displaying on the screen of the device the portion of the image while preventing public viewing of a remaining portion of the image by covering the remaining portion of the image using at least a part of the mask, wherein the portion of the image is displayed in a viewing window; and
  translating an entirety of the viewing window relative to the mask in response to a movement of a finger of the user while the finger is placed against the screen;
  wherein a relative position of the viewing window with respect to a finger-contact location on the screen remains the same during at least a part of the movement of the finger while the finger is placed against the screen; and
  wherein the relative position of the viewing window with respect to the finger-contact location is adjustable, and wherein an entirety of the viewing window is offset from the finger-contact location to prevent the finger from blocking the image being displayed in the viewing window.

43. The program product of claim 42, wherein the image comprises a message or a media content, and the mask is selectively configurable for private viewing of the message or the media content.

44. The program product of claim 42, wherein a transparency of the mask and/or a size of the viewing windows is adjustable.

* * * * *